(12) United States Patent
Jeon et al.

(10) Patent No.: US 11,513,628 B2
(45) Date of Patent: Nov. 29, 2022

(54) ELECTRONIC DEVICE

(71) Applicant: Samsung Display Co., Ltd., Yongin-si (KR)

(72) Inventors: Byeongkyu Jeon, Busan (KR); Jinwoo Kim, Hwaseong-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 17/249,721

(22) Filed: Mar. 10, 2021

(65) Prior Publication Data
US 2021/0365168 A1 Nov. 25, 2021

(30) Foreign Application Priority Data

May 25, 2020 (KR) .................. 10-2020-0062184

(51) Int. Cl.
*G06F 3/041* (2006.01)
*G06F 3/044* (2006.01)
*G06F 3/0354* (2013.01)

(52) U.S. Cl.
CPC ...... *G06F 3/04164* (2019.05); *G06F 3/03545* (2013.01); *G06F 3/0412* (2013.01); *G06F 3/0442* (2019.05); *G06F 3/0446* (2019.05); *G06F 2203/04106* (2013.01)

(58) Field of Classification Search
CPC ............ G06F 3/04164; G06F 3/03545; G06F 3/0412; G06F 3/0442; G06F 3/0446; G06F 2203/04106
See application file for complete search history.

(56) References Cited

U.S. PATENT DOCUMENTS

| | | | | |
|---|---|---|---|---|
| 9,195,351 B1* | 11/2015 | Rosenberg | ............ | G06F 1/1626 |
| 9,569,041 B2* | 2/2017 | Son | ..................... | G06F 3/044 |
| 10,496,205 B2* | 12/2019 | Jung | .................. | G06F 3/04162 |
| 10,606,389 B2* | 3/2020 | Ju | ......................... | G06F 3/0412 |
| 10,761,619 B2* | 9/2020 | Park | ................... | G06F 3/04162 |
| 11,048,360 B2* | 6/2021 | Jang | ................... | G06F 3/04162 |

(Continued)

FOREIGN PATENT DOCUMENTS

KR    10-2014-0078222 A    6/2014
KR       10-1727590 B1    5/2017

(Continued)

*Primary Examiner* — Amy Onyekaba
(74) *Attorney, Agent, or Firm* — Lewis Roca Rothgerber Christie LLP

(57) ABSTRACT

An electronic device includes: a display panel configured to display an image; an input sensor on the display panel and configured to sense a first input in first and second modes; a sensor controller connected to the input sensor; and an input device configured to transceive a signal with the sensor controller through the input sensor and to provide a second input to the input sensor, wherein the sensor controller is configured to sense the first input through the input sensor during a first input sensing frame and the second input generated by the input device during a second input sensing frame, and wherein the sensor controller is configured to transmit, to the input sensor, an integrated transmission signal comprising a recognition signal for recognizing the input device and a first mode sensing signal for sensing the first input in the first mode during a first operation period of the first input sensing frame.

26 Claims, 16 Drawing Sheets

(56) References Cited

U.S. PATENT DOCUMENTS

| | | | | |
|---|---|---|---|---|
| 2009/0128545 | A1* | 5/2009 | Lee | G06F 3/04166 345/214 |
| 2012/0044662 | A1* | 2/2012 | Kim | G06F 3/0443 361/816 |
| 2012/0068964 | A1* | 3/2012 | Wright | G06F 3/0442 345/174 |
| 2012/0306791 | A1* | 12/2012 | Lee | G06F 3/044 345/173 |
| 2014/0210744 | A1* | 7/2014 | Song | G06F 3/04883 345/173 |
| 2015/0049049 | A1* | 2/2015 | Kim | G06F 3/044 345/174 |
| 2015/0070297 | A1* | 3/2015 | Mao | G06F 3/0446 345/174 |
| 2015/0091864 | A1* | 4/2015 | Reynolds | G06F 3/04184 345/174 |
| 2016/0216841 | A1* | 7/2016 | Gotoh | G06F 3/0446 |
| 2017/0045966 | A1* | 2/2017 | An | G06F 3/0443 |
| 2017/0090670 | A1* | 3/2017 | Stevenson | G06F 3/0418 |
| 2017/0108970 | A1* | 4/2017 | Kim | G06F 3/0446 |
| 2017/0192534 | A1* | 7/2017 | Han | G06F 3/03545 |
| 2018/0089485 | A1* | 3/2018 | Bok | G06F 3/0412 |
| 2018/0113559 | A1* | 4/2018 | Bae | G06F 3/0442 |
| 2018/0120963 | A1* | 5/2018 | Hara | G06F 3/041 |
| 2018/0150178 | A1* | 5/2018 | Kim | G06F 3/04166 |
| 2018/0181241 | A1* | 6/2018 | Jung | G06F 3/0442 |
| 2018/0188836 | A1* | 7/2018 | Park | G06F 3/03545 |
| 2018/0299978 | A1* | 10/2018 | Tseng | G06F 3/04166 |
| 2018/0329563 | A1* | 11/2018 | Han | G06F 3/04162 |
| 2019/0004649 | A1* | 1/2019 | Ju | G06F 3/0412 |
| 2019/0113993 | A1* | 4/2019 | Lee | G06F 3/0446 |
| 2019/0196644 | A1* | 6/2019 | Chung | G06F 3/04162 |
| 2019/0204955 | A1* | 7/2019 | Haga | G06F 3/0448 |
| 2019/0235646 | A1* | 8/2019 | Karsuntsev | G06F 3/03545 |
| 2020/0050350 | A1* | 2/2020 | Lee | G06F 3/04883 |
| 2020/0073530 | A1* | 3/2020 | Kim | G06F 3/041661 |
| 2020/0081577 | A1* | 3/2020 | Nomura | G06F 3/0442 |
| 2020/0142508 | A1* | 5/2020 | Yamamoto | G06F 3/0446 |
| 2020/0201480 | A1* | 6/2020 | Choi | G06F 3/04162 |
| 2020/0333939 | A1* | 10/2020 | Nomura | G06F 3/044 |
| 2021/0018992 | A1* | 1/2021 | Karsuntsev | G06F 1/1616 |
| 2021/0124439 | A1* | 4/2021 | Yeom | G06F 3/03545 |
| 2021/0124449 | A1* | 4/2021 | Jang | G06F 3/0412 |
| 2021/0124473 | A1* | 4/2021 | Kim | G06F 3/0412 |
| 2021/0200356 | A1* | 7/2021 | Chung | G06F 3/041661 |

FOREIGN PATENT DOCUMENTS

| | | |
|---|---|---|
| KR | 10-2018-0077375 A | 7/2018 |
| KR | 10-2019-0070178 A | 6/2019 |
| KR | 10-1995403 B1 | 7/2019 |
| KR | 10-2081110 B1 | 2/2020 |
| KR | 10-2020-0025573 A | 3/2020 |

* cited by examiner

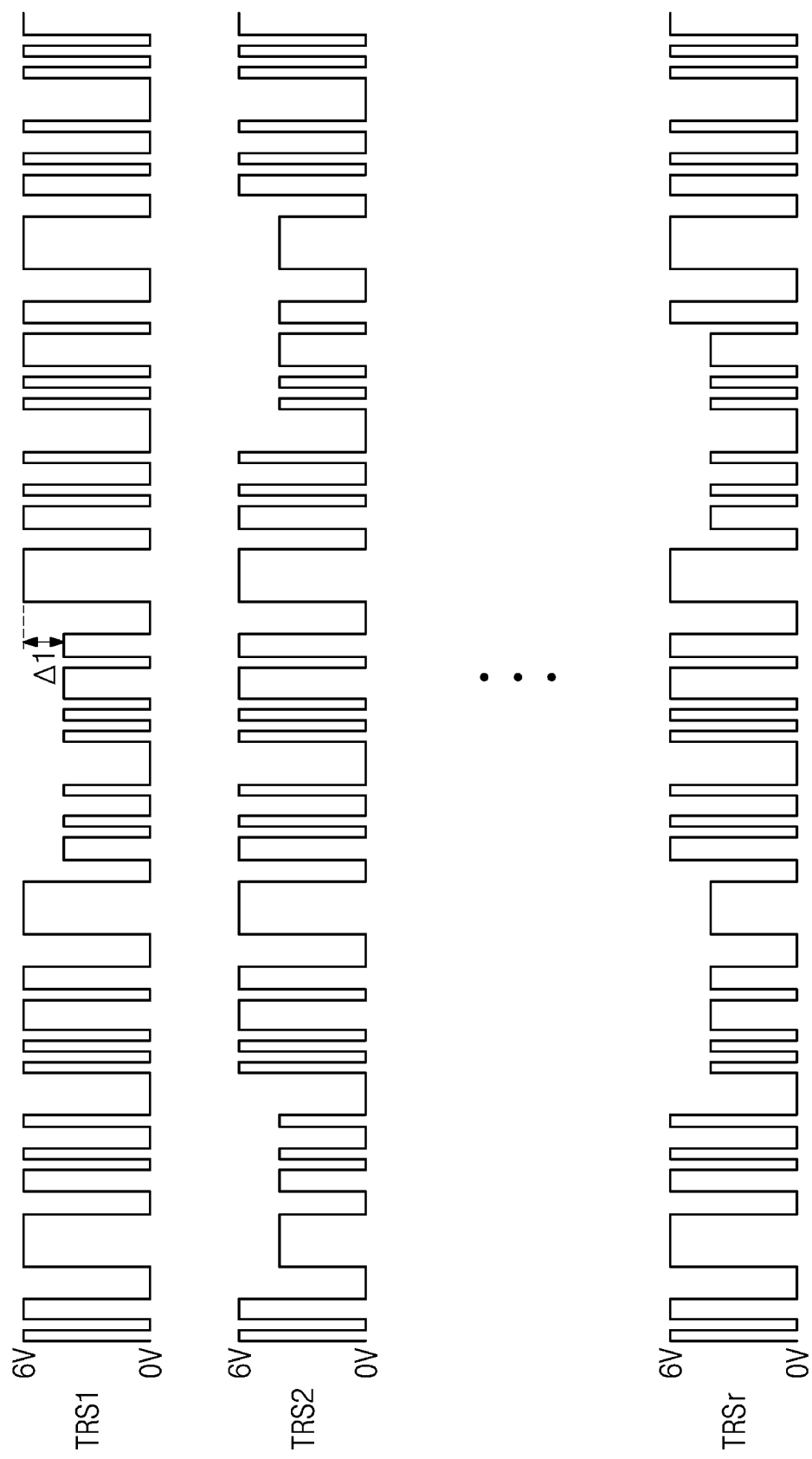

ELECTRONIC DEVICE

CROSS-REFERENCE TO RELATED APPLICATION

The present application claims priority to and the benefit of Korean Patent Application No. 10-2020-0062184, filed on May 25, 2020, the entire content of which is hereby incorporated by reference.

BACKGROUND

1. Field

Aspects of some example embodiments of the present disclosure herein relate to an electronic device.

2. Description of the Related Art

Multimedia electronic devices such as televisions, mobile phones, tablet computers, navigation units, and game consoles may include a display device for displaying an image. The electronic devices may include an input sensor capable of providing a touch-based input method allowing a user to easily input information or command in an intuitive and convenient manner compared to alternative input methods such as a button, a keyboard, or a mouse.

The input sensor may sense a pressure or a touch by using a user's body or other external object (e.g., a stylus). Usage of an electronic pen or stylus has been increasingly demanded for a user who is familiar to inputting information by using a pen or for a particular application program requiring a precise touch input (e.g., application program for sketch or drawing).

According to some example embodiments according to the present invention, an input sensor adopted to the electronic device may sense various inputs including not only the touch or the pressure caused by the user's body but also the input of the electronic pen.

The above information disclosed in this Background section is only for enhancement of understanding of the background and therefore the information discussed in this Background section does not necessarily constitute prior art.

SUMMARY

Aspects of some example embodiments of the present disclosure herein relate to an electronic device, and for example, to an electronic device having relatively improved input sensing performance.

Aspects of some example embodiments of the present disclosure include an electronic device capable of preventing or reducing instances of an input sensing performance being degraded during high-speed driving.

Aspects of some example embodiments of the inventive concept include an electronic device including: a display panel configured to display an image; an input sensor on the display panel to sense a first input in first and second modes; a sensor controller connected to the input sensor; and an input device configured to transceive a signal with the sensor controller through the input sensor and provide a second input to the input sensor.

According to some example embodiments, the sensor controller senses the first input through the input sensor during a first input sensing frame and the second input generated by the input device during a second input sensing frame. The sensor controller transmits, to the input sensor, an integrated transmission signal including a recognition signal for recognizing the input device and a first mode sensing signal for sensing the first input in the first mode during a first operation period of the first input sensing frame.

According to some example embodiments, an electronic device includes: a display panel configured to display an image; an input sensor on the display panel to sense a first input; a sensor controller connected to the input sensor; and an input device configured to transceive a signal with the sensor controller through the input sensor and provide a second input to the input sensor.

According to some example embodiments, the sensor controller senses the first input through the input sensor during a first input sensing frame and the second input generated by the input device during a second input sensing frame.

According to some example embodiments, the first input sensing frame includes a first recognition period for recognizing the input device, and the second input sensing frame includes a second recognition period for recognizing the input device. A signal transmitted to the input sensor during the first recognition period may be different from that transmitted to the input sensor during the second recognition period.

BRIEF DESCRIPTION OF THE DRAWINGS

The accompanying drawings are included to provide a further understanding of embodiments according to the inventive concept, and are incorporated in and constitute a part of this specification. The drawings illustrate aspects of some example embodiments of the inventive concept and, together with the description, serve to explain principles of embodiments according to the inventive concept. In the drawings:

FIG. 7B is a waveform diagram representing an integrated transmission signal accumulated during a plurality of first input sensing frames;

DETAILED DESCRIPTION

Figure 1A:
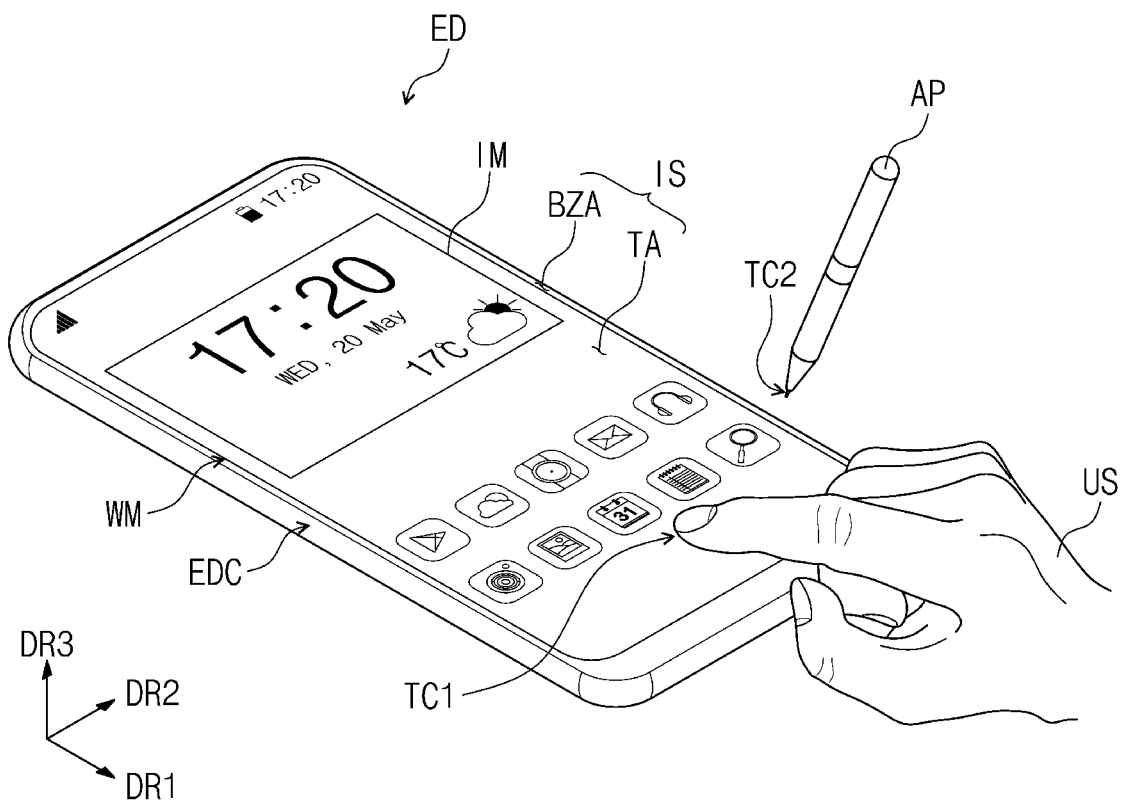
FIG. 1A is a perspective view of an electronic device according to some example embodiments of the inventive concept.

In this specification, it will also be understood that when one component (or region, layer, portion) is referred to as being cony, 'connected to', or 'coupled to' another component, it can be directly located/connected/coupled on/to the one component, or an intervening third component may also be present.

Like reference numerals refer to like elements throughout. Also, in the figures, the thickness, ratio, and dimensions of components are exaggerated for clarity of illustration.

The term "and/or" includes any and all combinations of one or more of the associated listed items.

It will be understood that although the terms such as 'first' and 'second' are used herein to describe various elements, these elements should not be limited by these terms. The terms are only used to distinguish one component from other components. For example, a first element referred to as a first element in one embodiment can be referred to as a second element in another embodiment without departing from the scope of the appended claims. The terms of a singular form may include plural forms unless referred to the contrary.

Also, "under", "below", "above", "upper", and the like are used for explaining relation association of components illustrated in the drawings. The terms may be a relative concept and described based on directions expressed in the drawings.

Unless otherwise defined, all terms (including technical and scientific terms) used herein have the same meaning as generally understood by those skilled in the art. Terms as defined in a commonly used dictionary should be construed as having the same meaning as in an associated technical context, and unless defined apparently in the description, the terms are not ideally or excessively construed as having formal meaning.

The meaning of 'include' or 'comprise' specifies a property, a fixed number, a step, an operation, an element, a component or a combination thereof, but does not exclude other properties, fixed numbers, steps, operations, elements, components or combinations thereof.

Hereinafter, aspects of some example embodiments of the inventive concept will be described in more detail with reference to the accompanying drawings.

Figure 1B:
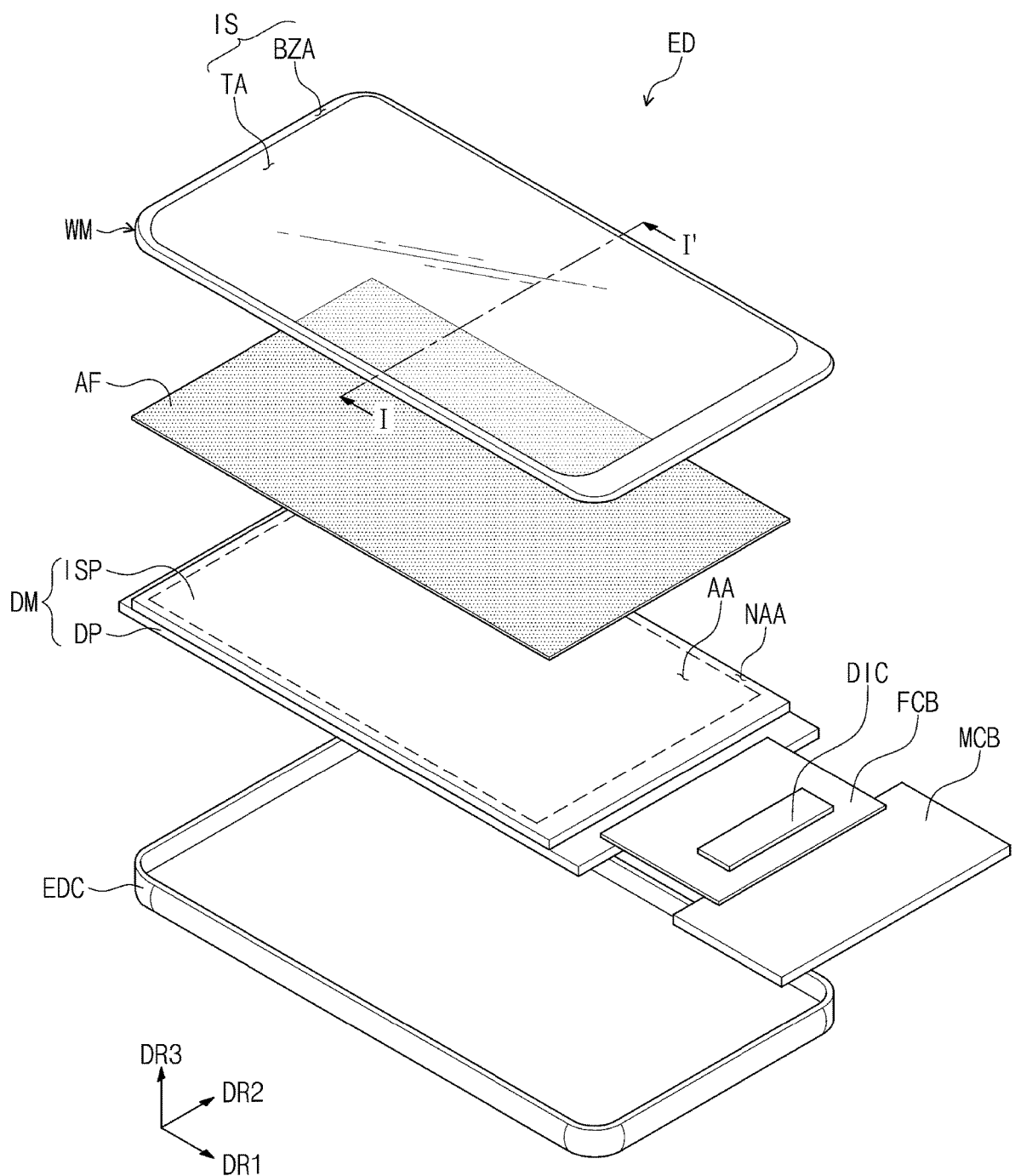
FIG. 1B is an exploded perspective view of the electronic device according to some example embodiments of the inventive concept.
Figure 1C:
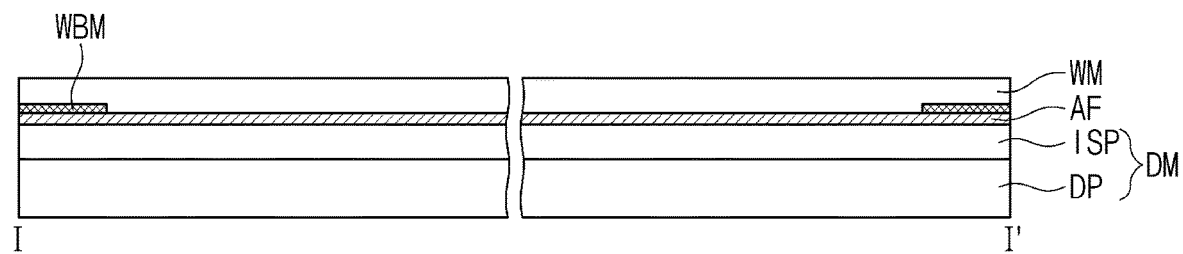
FIG. 1C is a cross-sectional view of the electronic device taken along the line of FIG. 1B.
Figure 1D:
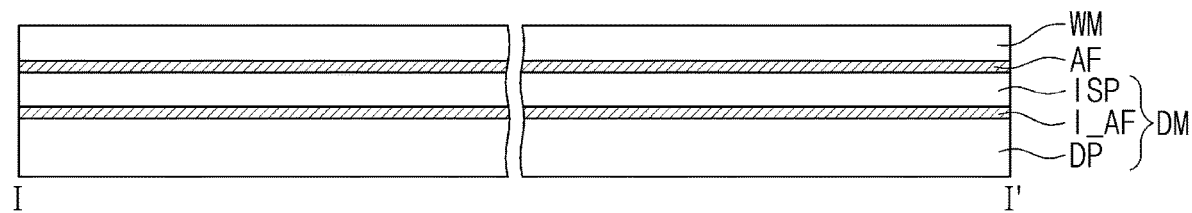
FIG. 1D is a cross-sectional view of the electronic device according to some example embodiments of the inventive concept.

FIG. 1A is a coupled perspective view of an electronic device according to some example embodiments of the inventive concept, and FIG. 1B is an exploded perspective view of the electronic device according to some example embodiments of the inventive concept. FIG. 1C is a cross-sectional view of the electronic device taken along the line I-I' of FIG. 1B, and FIG. 1D is a cross-sectional view of the electronic device according to some example embodiments of the inventive concept.

Referring to FIGS. 1A to 1C, an electronic device ED may be activated by an electrical signal. The electronic device ED may include various embodiments. For example, the electronic device ED may be applied to electronic devices such as smart watches, tablet computers, notebook computers, personal computers, and smart televisions.

The electronic device ED may display an image IM toward a third direction DR3 on a display surface IS in parallel to each of a first direction DR1 and a second direction DR2. The display surface IS on which the image IM is displayed may correspond to a front surface of the electronic device ED. The image IM may include a still image as well as a video.

According to some example embodiments, a front surface (or top surface) and a rear surface (or bottom surface) of each of members are defined based on a direction in which the image IM is displayed. The front surface and the rear surface may be opposite to each other in the third direction DR3, and a normal direction of each of the front surface and the rear surface may be parallel to the third direction DR3.

A spaced distance between the front surface and the rear surface in the third direction DR3 may correspond to a thickness of the electronic device ED in the third direction DR3. Here, directions indicated by the first to third directions DR1, DR2 and DR3, as relative concepts, may be converted with respect to each other.

The electronic device ED may sense an external input applied from the outside. The external input may include various types of inputs provided from the outside of the electronic device ED. The electronic device ED according to some example embodiments of the inventive concept may sense a first input TC1 of a user US applied from the outside. The first input TC1 of the user US may be one of various types of external inputs such as a portion of a user's body, light, heat or pressure, or a combination thereof. Although the first input TC1 of the user US is described as a touch input applied to the front surface caused by a hand of the user US, the embodiments according to the inventive concept are not limited thereto. For example, the first input TC1 of the user US may include various types. Also, the electronic device ED may sense the first input TC1 of the user US applied to a side surface or a rear surface of the electronic device ED according to a structure of the electronic device ED. However, the embodiments according to the inventive concept are not limited thereto.

Also, the electronic device ED according to some example embodiments of the inventive concept may sense a second input TC2 applied from the outside. The second input TC2 may include inputs caused by an input device AP (e.g., a stylus pen, an active pen, a touch pen, an electronic pen, an e-pen, etc.) besides the hand of the user US. Hereinafter, the second input TC2 will be described as an example input caused by an active pen.

The front surface of the electronic device ED may be divided into a transmission area TA and a bezel area BZA. The transmission area TA may be an area on which the image IM is displayed. The user may recognize the image IM through the transmission area TA. According to some example embodiments, the transmission area TA has a rectangular shape having rounded vertices. However, this is merely illustrative. The transmission area TA may have various shapes, and the embodiments of the inventive concept are not limited to the shape of the transmission area TA.

The bezel area BZA is located adjacent to (e.g., around a periphery of, or outside a footprint of) the transmission area TA. The bezel area BZA may have a color (e.g., a set or predetermined color). The bezel area BZA defines a shape of the transmission area TA. Thus, the transmission area TA may have a shape that is substantially defined by the bezel area BA. The bezel area BZA may be located adjacent to only one side of the transmission area TA. According to some example embodiments, however, the bezel area BZA may be omitted. The electronic device ED according to some example embodiments of the inventive concept may include various embodiments and may not be limited to any one embodiment.

As illustrated in FIG. 1B, the electronic device ED may include a display module DM and a window WM located on the display module DM. The display module DM may include a display panel DP and an input sensor ISP.

Although the display panel DP according to some example embodiments of the inventive concept may be a light emitting display panel, the embodiments of the inventive concept are not particularly limited thereto. For example, the display panel DP may be an organic light emitting display panel or a quantum-dot light emitting display panel. The organic light emitting display panel may include a light emitting layer containing an organic light emitting material. The quantum dot light emitting display panel may include a light emitting layer containing a quantum dot and a quantum rod. Hereinafter, the display panel DP will be described as the organic light emitting display panel.

Referring to FIG. 1C, the input sensor ISP may be located directly on the display panel DP. According to some example embodiments of the inventive concept, the input sensor ISP may be provided on the display panel DP through a continuous process. That is, when the input sensor ISP is located directly on the display panel DP, an adhesive film may not be located between the input sensor ISP and the display panel DP. However, as illustrated in FIG. 1D, an inner adhesive film I_AF may be located between the input sensor ISP and the display panel DP. In this case, the input sensor ISP may be manufactured through a process separated from the display panel DP and then fixed to a top surface of the display panel DP by the inner adhesive film I_AF instead of being manufactured by a continuous process with the display panel DP.

The display panel DP generates an image, and the input sensor ISP acquires coordinate information of an external input (e.g., the first and second inputs).

The window WM may be made of a transparent material capable of emitting the image. For example, the window may be made of glass, sapphire, plastic, and the like.

Although the window WM has a single layer in the drawing, the embodiments according to the inventive concept are not limited thereto. For example, the window WM may include a plurality of layers. According to some example embodiments, the above-described bezel area BZA of the electronic device ED may be obtained by printing a material having a color (e.g., a set or predetermined color) on one area of the window WM. According to some example embodiments of the inventive concept, the window WM may include a light shielding pattern WBM for defining the bezel area BZA. The light shielding pattern WBM may be a colored organic layer and provided by, e.g., any suitable coating method.

The window WM may be coupled with the display module DM through an adhesive film AF. According to some example embodiments of the inventive concept, the adhesive film AF may include an optically clear adhesive film (OCA). However, the embodiments according to the inventive concept are not limited to the adhesive film AF. For example, the adhesive film AF may include a typical adhesive or sticking agent. For example, the adhesive film AF may include an optically clear resin (OCR) or a pressure sensitive adhesive film (PSA).

An anti-reflection layer may be further located between the window WM and the display module DM. The anti-reflection layer reduces a reflectance of external light incident from above the window WM. The anti-reflection layer according to some example embodiments of the inventive concept may include a retarder and a polarizer. The retarder may be a film type or a liquid crystal coating type and include a $\lambda/2$ retarder and/or a $\lambda/4$ retarder. The polarizer may be also a film type or a liquid crystal coating type. The film type may include a flexible synthetic resin film, and the liquid crystal coating type may include liquid crystals (e.g., arranged in a set or predetermined arrangement). The retarder and the polarizer may be realized by one polarizing film.

The display module DM may display an image according to an electrical signal and transceive information on an external input. The display module DM may be defined by an active area AA and a peripheral area NAA. The active area AA may be defined as an area emitting an image provided from the display module DM.

The peripheral area NAA is located adjacent to the active area AA. For example, the peripheral area NAA may surround the active area AA. The peripheral area NAA may have various shapes, and the embodiments according to the inventive concept are not limited to the shape of the peripheral area NAA. According to some example embodiments, the active area AA of the display module DM may correspond to at least a portion of the transmission area TA.

The display module DM may further include a main circuit board MCB, a flexible circuit film FCB and a driving chip DIC. The main circuit board MCB may be connected to the flexible circuit film FCB and electrically connected to the display panel DP. The main circuit board MCB may include a plurality of driving elements. The plurality of driving elements may include a circuit unit for driving the display panel DP. The flexible circuit film FCB may be connected to the display panel DP to electrically connect the display panel DP with the main circuit board MCB. The driving chip DIC may be mounted on the flexible circuit film FCB.

The driving chip DIC may include driving elements for driving a pixel of the display panel DP, e.g., a data driving circuit. Although one flexible circuit film FCB according to some example embodiments of the inventive concept is illustrated, the embodiments according to the inventive concept are not limited thereto. For example, a plurality of flexible circuit films FCB may be provided and connected to the display panel DP. Although a structure of the driving chip DIC mounted on the flexible circuit film FCB is illustrated in FIG. 1B, the embodiments according to the inventive concept are not limited thereto. For example, according to some example embodiments, the driving chip DIC may be mounted directly on the display panel DP. In this case, a portion, on which the driving chip DIC is mounted, of the display panel DP may be bent to be located on a rear surface of the display module DM.

The input sensor ISP may be electrically connected to the main circuit board MCB through the flexible circuit film FCB. However, the embodiments according to the inventive concept are not limited thereto. That is, the display module DM may additionally include a separate flexible circuit film for electrically connecting the input sensor ISP with the main circuit board MCB.

The electronic device ED may further include an external case EDC accommodating the display module DM. The external case EDC may be coupled with the window WM to define an appearance of the electronic device ED. The external case EDC adsorbs an impact applied from the outside and prevents foreign substances/moisture from permeating into the display module DM to protect components accommodated in the external case EDC. According to some example embodiments of the inventive concept, the external case EDC may be provided by coupling a plurality of accommodation members.

The electronic device ED according to some example embodiments may further include an electronic module including various functional modules for operating the display module DM, a power supply module supplying a power necessary for an overall operation of the electronic device ED, and a bracket coupled with the display module DM and/or the external case EDC to divide an inner space of the electronic device ED.

Figure 2A:
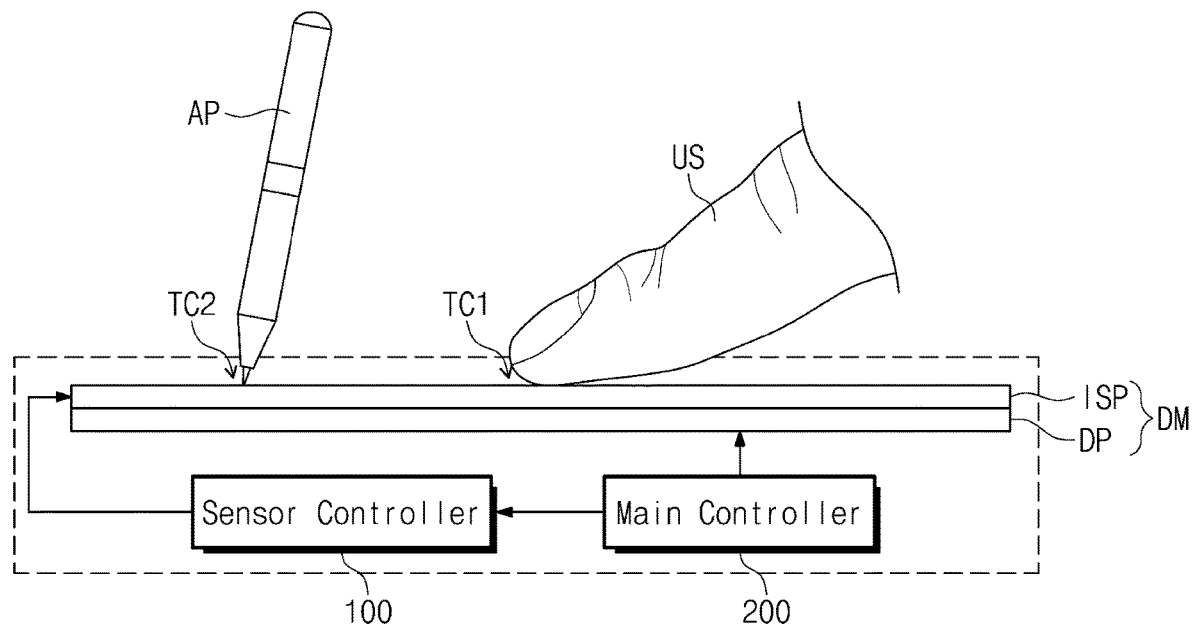
FIG. 2A is a block diagram for explaining an operation of the electronic device according to some example embodiments of the inventive concept.
Figure 2B:
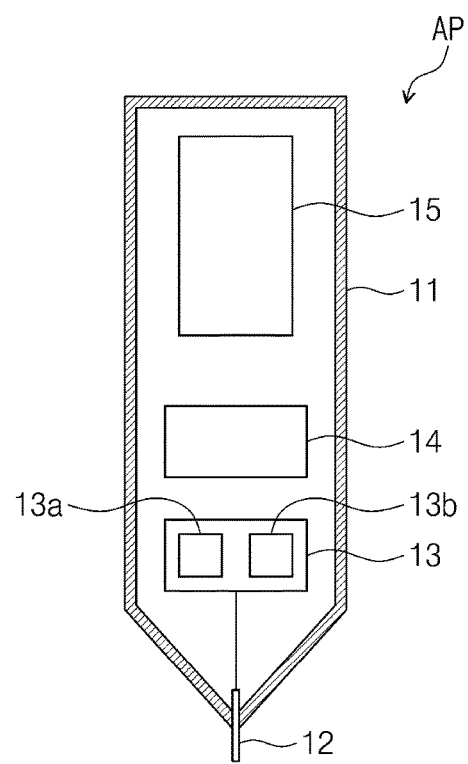
FIG. 2B is a block diagram of an input device in FIG. 2A.
Figure 3:
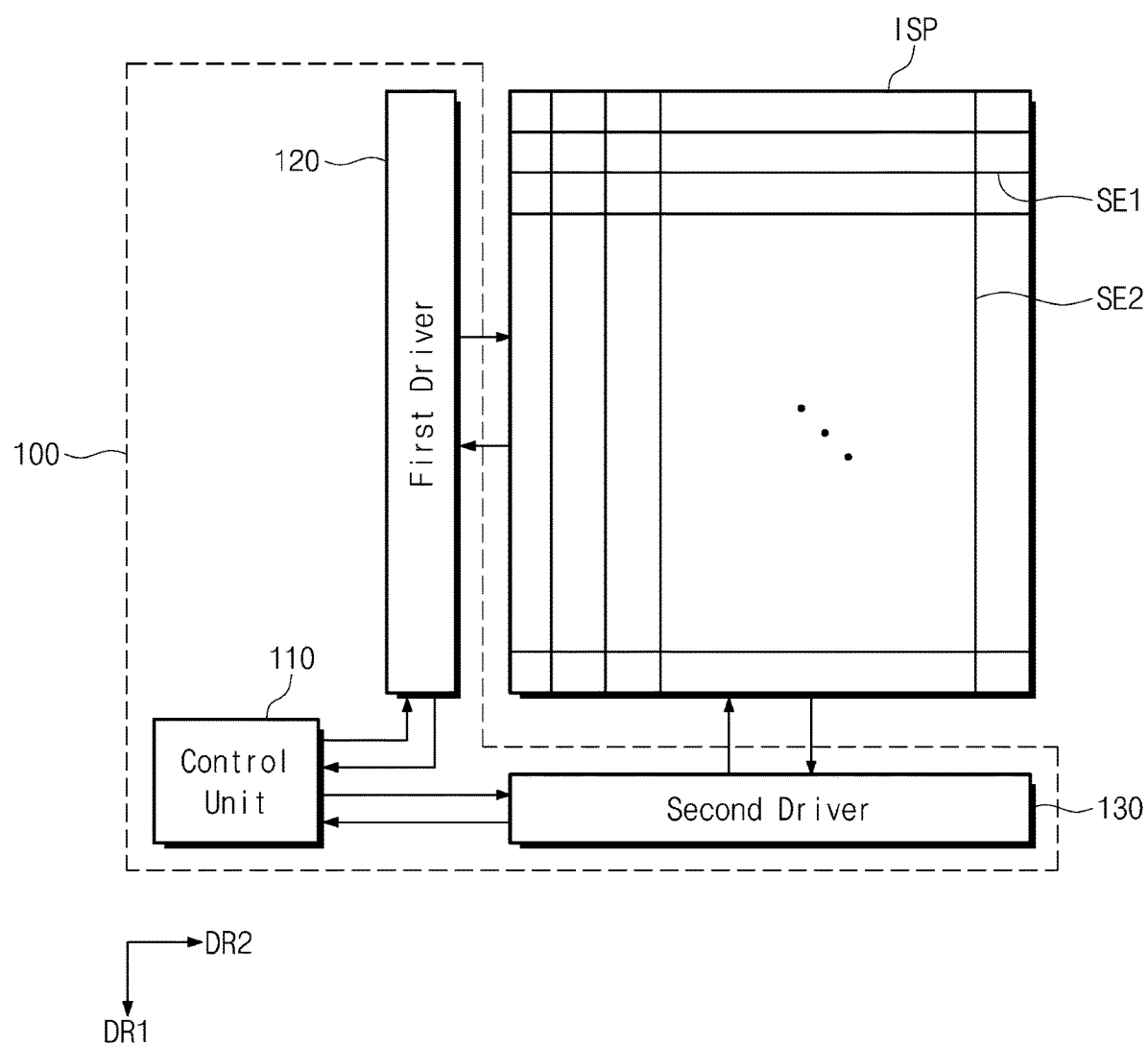
FIG. 3 is a block diagram representing a configuration of an input sensor and a sensor controller according to some example embodiments of the inventive concept.

FIG. 2A is a block diagram for explaining an operation of the electronic device according to some example embodiments of the inventive concept, and FIG. 2B is a block diagram of an input device in FIG. 2A. FIG. 3 is a block diagram representing a configuration of the input sensor and a sensor controller according to some example embodiments of the inventive concept.

Referring to FIGS. 2A, 2B and 3, the electronic device ED according to some example embodiments of the inventive concept further includes a main controller 200 for controlling driving of the display panel DM and a sensor controller 100 connected to the input sensor ISP. The main controller 200 may be connected to the sensor controller 100 and control the driving of the sensor controller 100. According to some example embodiments of the inventive concept, the main controller 200 and the sensor controller 100 may be mounted to the main circuit board MCB (refer to FIG. 1B). Alternatively, according to some example embodiments, the sensor controller 100 may be embedded in the driving chip DIC (refer to FIG. 1B).

The input sensor ISP includes first sensing electrodes SE1 and second sensing electrodes SE2 that are electrically insulated from the first sensing electrodes SE1. The first sensing electrodes SE1 may each extend in the second direction DR2 and be arranged in the first direction DR1 crossing the second direction DR2. The second sensing electrodes SE2 may each extend in the first direction DR1 and be arranged in the second direction DR2. The first sensing electrodes SE1 and the second sensing electrodes SE2 may cross each other and be capacitively coupled by a crossed portion.

Although each of the first and second sensing electrodes SE1 and sE2 are illustrated as having a bar shape in FIG. 3, the embodiments according to the inventive concept are not limited thereto. For example, each of the first and second sensing electrodes SE1 and SE2 may include a plurality of mesh lines.

The sensor controller 100 includes a first driver 120 connected to the first sensing electrodes SE1 of the input sensor ISP and a second driver 130 connected to the second sensing electrodes SE2 of the input sensor ISP. The sensor controller 100 may further include a control unit 110 controlling driving of the first and second drivers 120 and 130.

The sensor controller 100 may operate the input sensor ISP to sense the first input TC1 and communicate with the input device AP through the input sensor ISP to sense the second input TC2.

The input device AP may include a housing 11, a conductive tip 12, and a communication module 13. The housing 11 may have a pen shape including an inner accommodation space. The conductive tip 12 may protrude from one opened side of the housing 11 to the outside. The conductive tip 12 may be a portion directly contacting the input sensor ISP in the input device AP.

The communication module 13 may include a transmitting circuit 13a and a receiving circuit 13b. The transmitting circuit 13a may transmit a downlink signal to the sensor controller 100. The downlink signal may include a position of the input device AP, an inclination of the input device AP, state information, etc. The sensor controller 100 may receive the downlink signal through the input sensor ISP when the input device AP contacts the input sensor ISP.

The receiving circuit 13b may receive an uplink signal from the sensor controller 100. The uplink signal may include information such as panel information and a protocol version. The sensor controller 100 may provide the uplink signal to the input sensor ISP, and the input device AP may receive the uplink signal through contact with the input sensor ISP.

The input device AP further includes an input controller 14 controlling driving of the input device AP. The input controller 14 may be operated according to a regulated program. The transmitting circuit 13a receives a signal supplied from the input controller 14 to modulate the received signal into a signal sensible by the input sensor ISP, and the receiving circuit 13b modulates a signal received through the input sensor ISP into a signal processable by the input controller 14.

The input device AP may further include a power module 15 for supplying a power to the input device AP.

Figure 4A:
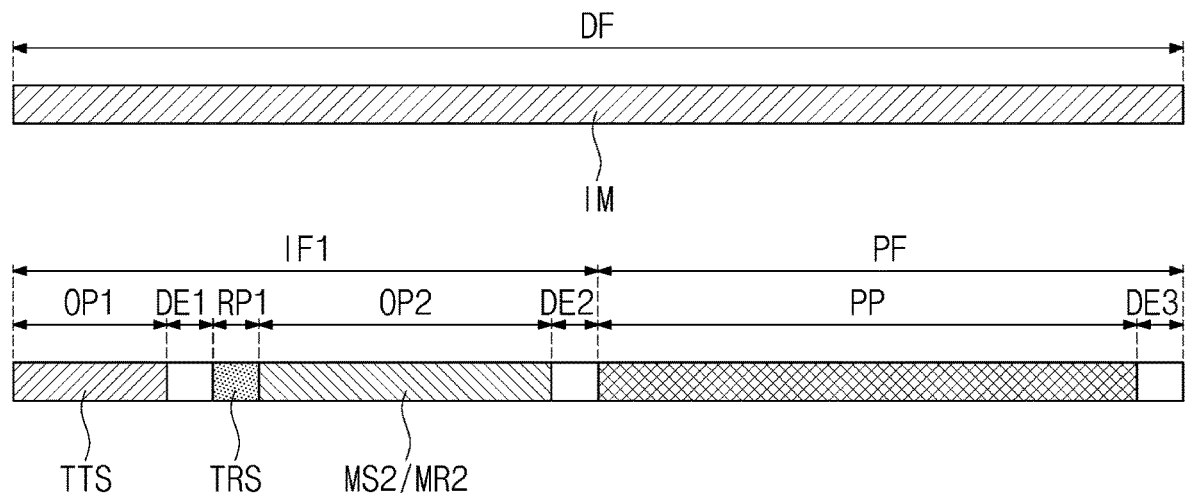
FIG. 4A is a conceptual view for explaining an operation at a first input sensing frame according to some example embodiments of the inventive concept.
Figure 4B:
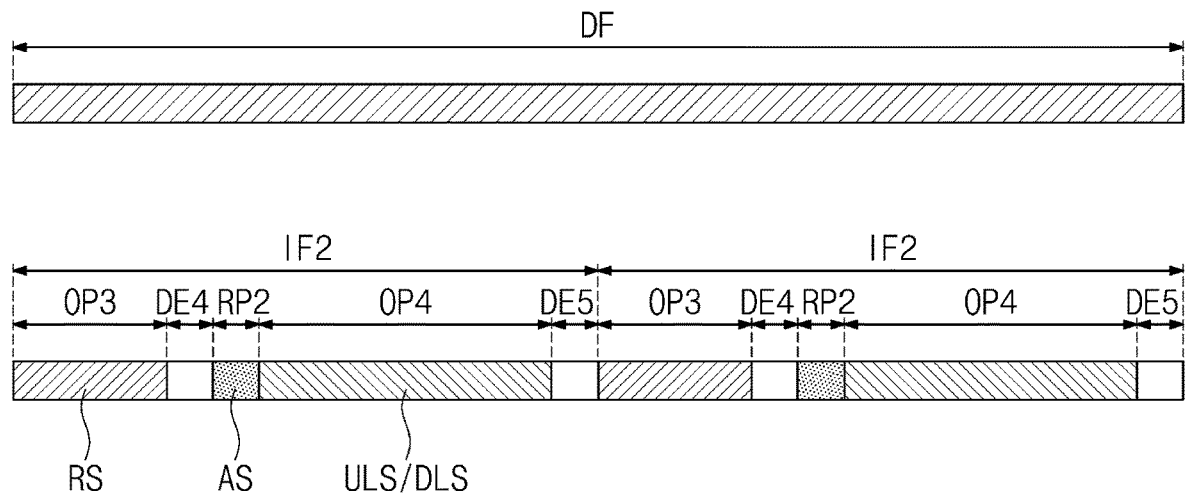
FIG. 4B is a conceptual view for explaining an operation at a second input sensing frame according to some example embodiments of the inventive concept.

FIG. 4A is a conceptual view for explaining an operation at a first input sensing frame according to some example embodiments of the inventive concept, and FIG. 4B is a conceptual view for explaining an operation at a second input sensing frame according to some example embodiments of the inventive concept.

Referring to FIGS. 2A to 4B, the electronic device ED displays an image through the display panel DP. The display panel DP may display the image IM in a unit of one display frame DF. When the display panel DP has an operation frequency of about 120 Hz, a time corresponding to the one display frame DF may be about 8.33 ms.

While the electronic device ED displays the image through the display panel DP, the electronic device ED senses the first input TC1 and the second input TC2. The electronic device ED may be operated in a first input sensing mode sensing the first input TC1 or in a second input sensing mode sensing the second input TC2 according to whether the input device AP exists. For example, the electronic device ED may be operated in the first input sensing mode when the input device AP is not sensed and operated in the second input sensing mode when the input device AP is sensed.

According to some example embodiments of the inventive concept, an operation frequency of the input sensor ISP in the first and second input sensing modes may be equal to or greater than that of the display panel DP. For example, when the display panel DP has the operation frequency of about 120 Hz, the input sensor ISP may have the operation frequency of about 240 Hz. The input sensor ISP may sense the first input TC1 in a unit of one first input sensing frame IF1 when the input sensor ISP is operated in the first input sensing mode and the second input TC2 in a unit of one second input sensing frame IF2 when the input sensor ISP is operated in the second input sensing mode. Here, a time corresponding to each of the first and second input sensing frames IF1 and IF2 may be about 4.16 ms.

According to some example embodiments of the inventive concept, the input sensor ISP may sense the first input TC1 in the first mode and the second mode when the input sensor ISP is operated in the first input sensing mode. Here, the first mode may be defined as a self-cap operation mode that senses the first input TC1 as the first and second sensing electrodes SE1 and SE2 of the input sensor ISP are integrated into one sensing electrode. The second mode may be defined as a mutual-cap operation mode that senses the first input TC1 as the first and second sensing electrodes SE1 and SE2 of the input sensor ISP are capacitively coupled to each other.

The input sensor ISP is operated in the first input sensing mode during the first input sensing frame IF1. The first input sensing frame IF1 may include a first operation period OP1 and a second operation period OP2. The input sensor ISP may sense the first input TC1 during the first operation period OP1 in the first mode and sense the first input TC1 during the second operation period OP2 in the second mode. According to some example embodiments of the inventive concept, the second operation period OP2 may be located after the first operation period OP1 in the first input sensing frame IF1. Also, the second operation period OP2 may have a time width greater than that of the first operation period OP1.

When the input sensor ISP is operated in the first input sensing mode, the sensor controller 100 may transmit an integrated transmission signal TTS to the input sensor ISP during the first operation period OP1. The integrated transmission signal TTS may include a recognition signal for recognizing the input device AP and include a first mode sensing signal for sensing the first input in the first mode. That is, the first operation period OP1 may be defined as a first recognition period for recognizing the input device AP and be defined as a period for sensing the first input TC1 in the first mode.

The first input sensing frame IF1 further includes a first response period RP1 located between the first operation period OP1 and the second operation period OP2 to receive an integrated reception signal TRS from the input sensor ISP. The integrated reception signal TRS may include recognition information on whether the input device AP exists and sensing information for the first input TC1 sensed in the first mode.

A first delay period DE1 may be located between the first operation period OP1 and the first response period RP1. That is, the first response period RP1 may be separated by the first delay period DE1 in terms of time from the first operation period OP1.

When the input sensor ISP is operated in the first input sensing mode, the sensor controller 100 may transmit a second mode sensing signal MS2 to the first sensing electrodes SE1 of the input sensor ISP during the second operation period OP2 and receive a sensing reception signal MR2 from the second sensing electrodes SE2. Thus, the input sensor ISP may be operated in the second mode by the sensor controller 100 during the second operation period OP2.

The first input sensing frame IF1 may further include a second delay period DE2 located behind or after the second operation period OP2. That is, the second operation period OP2 may be completed, the second delay period DE2 may be delayed, and then a next first input sensing frame IF1 may be initiated.

According to some example embodiments of the inventive concept, a processing frame PF may be further located between two first input sensing frames IF1 adjacent to each other in term of time. The processing frame PF may process signals sensed through the first input sensing frames IF1 to generate coordinate information. The processing frame PF may have the same time width as the first input sensing frames IF1. Also, the processing frame PF may include a processing period PP and a third delay period DE3.

The input sensor ISP is operated in the second input sensing mode during the second input sensing frame IF2. The second input sensing frame IF2 may include a third operation period OP3 and a fourth operation period OP4.

The sensor controller 100 may transmit a recognition signal RS for recognizing the input device AP to the input sensor ISP during the third operation period OP3. That is, the third operation period OP3 in the second input sensing frame IF2 may be defined as a second recognition period for recognizing the input device AP. A signal transmitted to the input sensor ISP during the third recognition period OP3 of the second input sensing frame IF2 may be different from that transmitted to the input sensor ISP during the first recognition period OP1 of the first input sensing frame IF1. The signal transmitted to the input sensor ISP during the first recognition period OP1 may be the integrated sensing signal TTS in which the recognition signal and the first mode sensing signal are integrated, and the signal transmitted to the input sensor ISP during the third recognition period OP3 may include only the recognition signal.

The sensor controller 100 may transmit an uplink signal ULS to the input sensor ISP during the fourth operation period OP4 and receive a downlink signal DLS from the input sensor ISP to sense the second input TC2 inputted through the input device AP. That is, the fourth operation period OP4 in the second input sensing frame IF2 may be defined as a period for sensing the second input TC2 from the input device AP.

The second input sensing frame IF2 may further include a second response period RP2 located between the third operation period OP3 and the fourth operation period OP4 and receiving a response signal AS from the input device AP. The response signal AS may include recognition information on whether the input device AP exists.

A fourth delay period DE4 may be located between the third operation period OP3 and the second response period RP2. That is, the second response period RP2 may be separated by the fourth delay period DE4 in terms of time from the third operation period OP3.

The second input sensing frame IF2 may further include a fifth delay period DE5 located behind the fourth operation period OP4. That is, the fourth operation period OP4 may be completed, the fifth delay period DE5 may be delayed, and then a next second input sensing frame IF2 may be initiated.

As described above, when the input sensor ISP is operated in the first input sensing mode, a recognition operation of the input device AP and a first input sensing operation in the first mode may be performed at the same time by using the integrated transmission signal TTS during the first operation period OP1. Thus, the input sensor ISP may prevent the period of sensing the first input TC1 from decreasing by the period allocated for recognizing the input device AP in the high-speed driving electronic device ED. That is, since the period allocated for recognizing the input device AP may be used to sense the first input TC1, degradation in input sensing performance of the input sensor ISP during the high-speed driving may be prevented.

Figure 5:
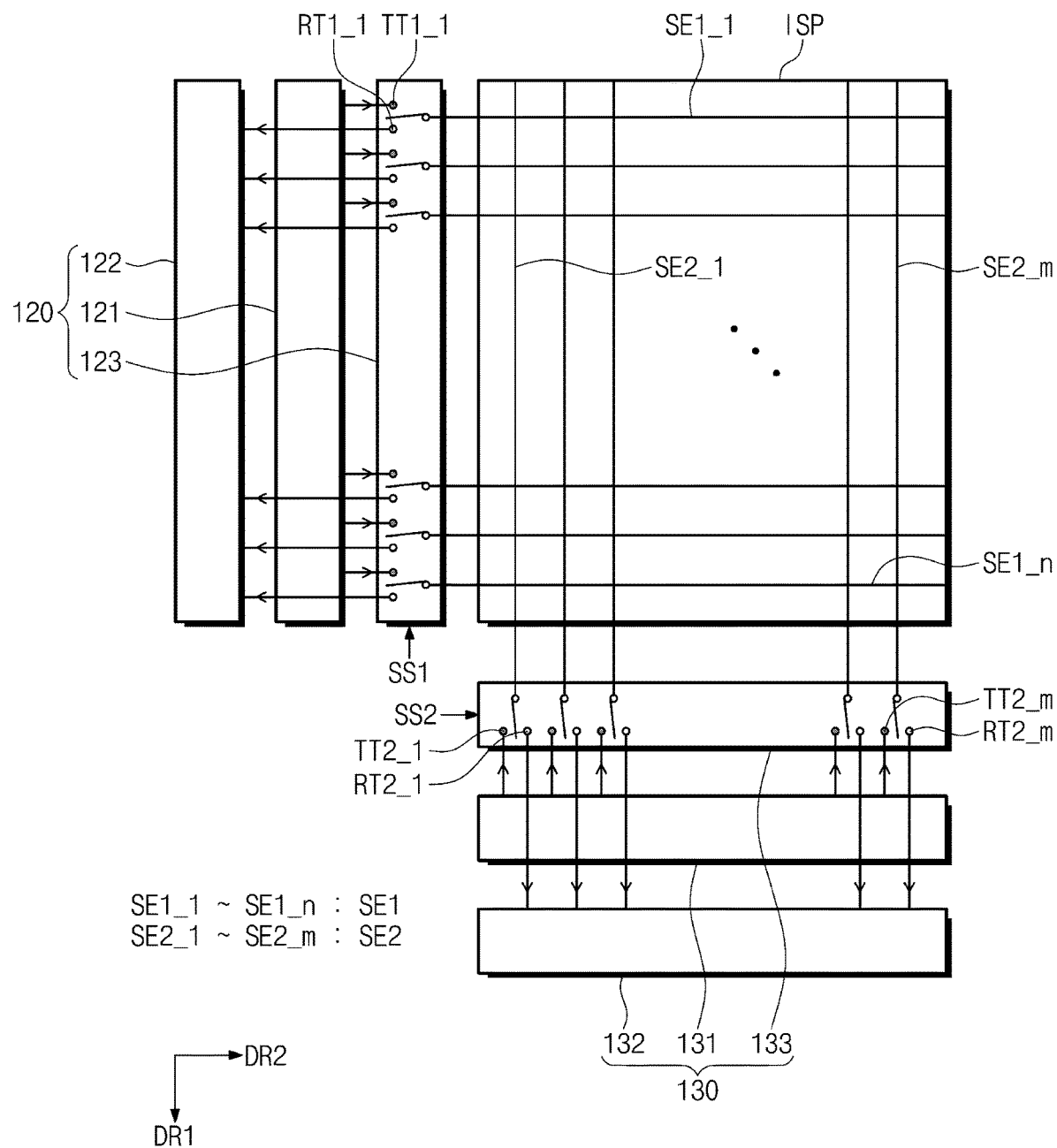
FIG. 5 is a block diagram representing a connection relationship between first and second drivers and the input sensor in FIG. 3.
Figure 6:
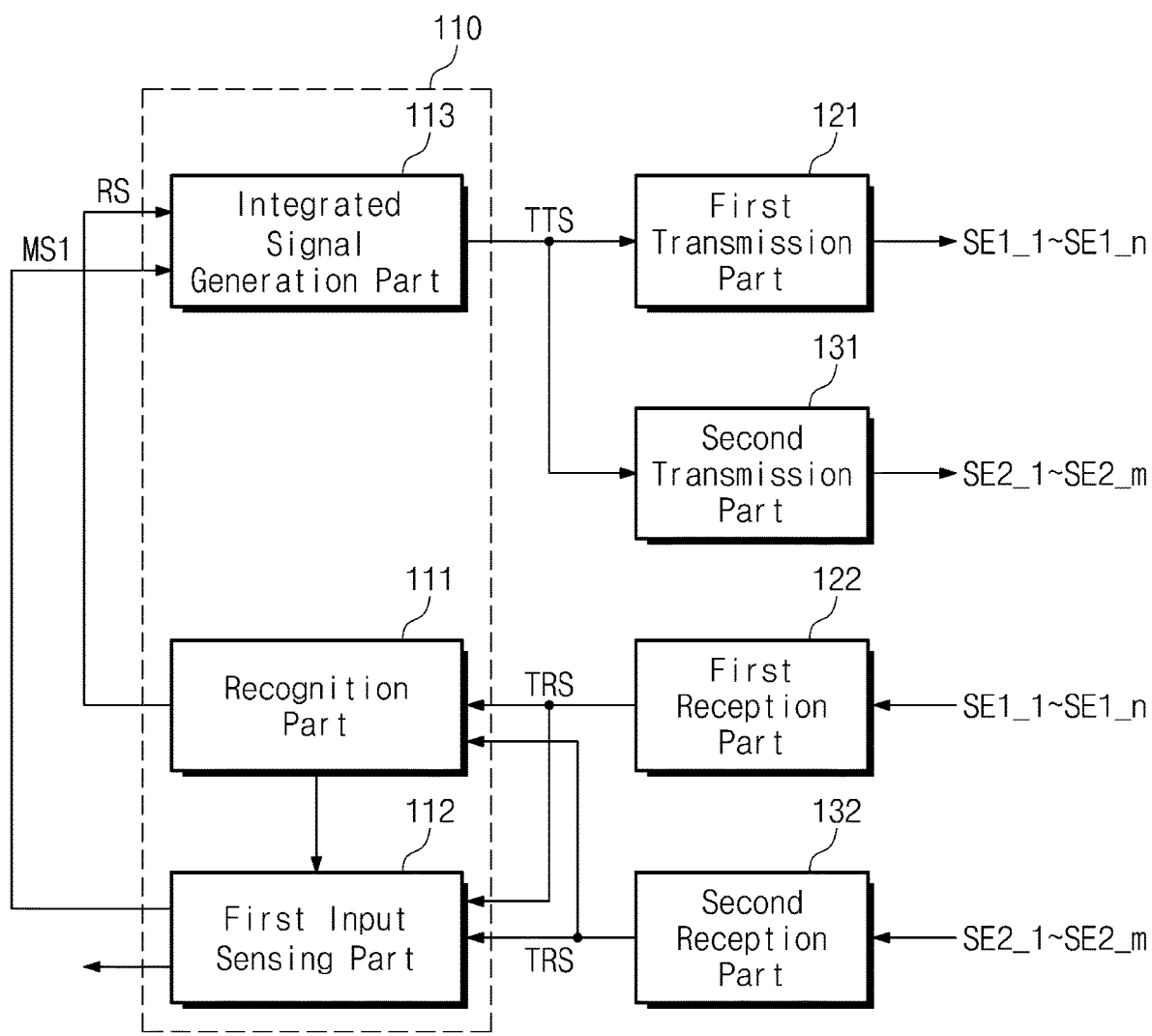
FIG. 6 is a block diagram representing a connection relationship between the first and second drivers and a control unit during a first operation period of the first input sensing frame according to some example embodiments of the inventive concept.
Figure 7A:
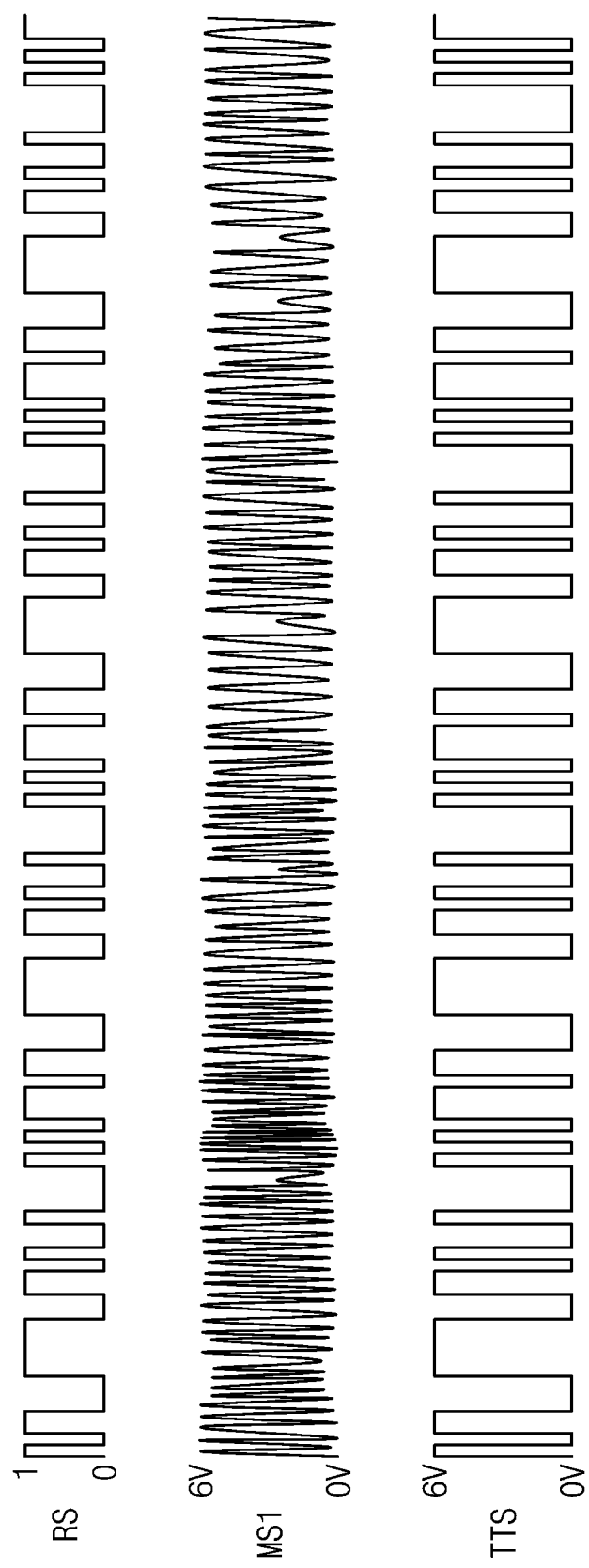
FIG. 7A is a waveform diagram representing a recognition signal, a first mode sensing signal and an integrated transmission signal in FIG. 6.

FIG. 5 is a block diagram representing a connection relationship between first and second drivers and the input sensor in FIG. 3, and FIG. 6 is a block diagram representing a connection relationship between the first and second drivers and the control unit during the first operation period of the first input sensing frame according to some example embodiments of the inventive concept. FIG. 7A is a waveform diagram representing the recognition signal, the sensing signal, and the integrated transmission signal in FIG. 6, and FIG. 7B is a waveform diagram representing the integrated transmission signal accumulated during a plurality of first input sensing frames.

Referring to FIGS. 3 and 5, the input sensor ISP includes the first sensing electrodes SE1 and the second sensing electrodes SE2. The first sensing electrodes SE1 and the second sensing electrodes SE2 are electrically insulated from each other. According to some example embodiments of the inventive concept, the first sensing electrodes SE1 include n first sensing electrodes SE1_1 to SE1_n, and the second sensing electrodes SE2 include m second sensing electrodes SE2_1 to SE2_m. Here, n and m are natural numbers equal to or greater than 1. Although n may be greater than m, the embodiments according to the inventive concept are not limited thereto. That is, n may be equal to or less than m. Hereinafter, for convenience of description, then first sensing electrodes SE1_1 to SE1_n are expressed by first sensing electrodes SE1_1 to SE1_n, and the m second sensing electrodes SE2_1 to SE2_m are expressed by second sensing electrodes SE2_1 to SE2_m.

The first sensing electrodes SE1_1 to SE1_n are connected to the first driver 120, and the second sensing electrode SE2_1 to SE2_m are connected to the second driver 130. According to some example embodiments of the inventive concept, the first driver 120 includes a first transmission part 121, a first reception part 122, and a first switching part 123. The second driver 130 includes a second transmission part 131, a second reception part 132, and a second switching part 133.

The first transmission part 121 is connected to the control unit 110 and transmits a signal received from the control unit 110 to the first sensing electrodes SE1_1 to SE1_n. The first reception part 122 receives a signal from the first sensing electrodes SE1_1 to SE1_n and provides the received signal to the control unit 110. The first switching part 123 selectively connects the first sensing electrodes SE1_1 to SE1_n to the first transmission part 121 or the first reception part 122 in response to a first selection signal SS1. For example, the first switching part 123 may connect the first sensing electrodes SE1_1 to SE1_n to first transmission terminals TT1_1 to TT1_n in response to the first selection signal SS1 of a first state and the first sensing electrodes SE1_1 to SE1_n to first reception terminals RT1_1 to RT1_n in response to the first selection signal SS1 of a second state. The first transmission terminals TT1_1 to TT1_n may be terminals connected to the first transmission part 121, and the first reception terminals RT1_1 to RT1_n may be terminals connected to the first reception part 122.

The second transmission part 131 is connected to the control unit 110 and transmits a signal received from the control unit 110 to the second sensing electrodes SE2_1 to SE2_m. The second reception part 132 receives a signal from the second sensing electrodes SE2_1 to SE2_m and provides the received signal to the control unit 110. The second switching part 133 selectively connects the second sensing electrodes SE2_1 to SE2_m to the second transmission part 131 or the second reception part 132 in response to a second selection signal SS2. For example, the second switching part 133 may connect the second sensing electrodes SE2_1 to SE2_m to second transmission terminals TT2_1 to TT2_m in response to a second selection signal SS2 of a first state and the second sensing electrodes SE2_1 to SE2_m to second reception terminals RT2_1 to RT2_m in response to a second selection signal SS2 of a second state. The second transmission terminals TT2_1 to TT2_m may be terminals connected to the second transmission part 131, and the second reception terminals RT2_1 to RT2_m may be terminals connected to the second reception part 132.

Referring to FIGS. 2A, 4A, 5, and 6, the control unit 110 includes a recognition part 111, a first input sensing part 112, and an integrated signal generation part 113.

The recognition part 111 outputs the recognition signal RS for recognizing the input device AP. The recognition signal RS outputted from the recognition part 111 during the first input sensing frame IF1 may be provided to the integrated signal generation part 113.

The first input sensing part 112 may output a signal for sensing the first input TC1 during the first input sensing frame IF1. For example, the first input sensing part 112 may output a first mode sensing signal MS1 for sensing the first input TC1 in the first mode during the first operation period OP1 of the first input sensing frame IF1. The first mode sensing signal MS1 outputted from the first input sensing part 112 during the first input sensing frame IF1 may be provided to the integrated signal generation part 113.

The integrated signal generation part 113 may generate the integrated transmission signal TTS by integrating the recognition signal RS and the first mode sensing signal MS1 and provide the generated integrated transmission signal TTS to the first and second drivers 120 and 130. For example, the integrated transmission signal TTS may be provided to the first reception part 122 of the first driver 120 and the second reception part 132 of the second driver 130. The integrated transmission signal TTS may be transmitted to the first sensing electrodes SE1_1 to SE1_n through the first transmission part 121 and the second sensing electrodes SE2_1 to SE2_m through the second transmission part 131.

As illustrated in FIG. 7A, the recognition signal RS may be a digital signal expressed by a logic 0 and a logic 1, and the first mode sensing signal MS1 may be an analog signal. According to some example embodiments of the inventive concept, the first mode sensing signal MS1 may be a voltage signal that swings between about 0V to about 6V. The integrated signal generation part 113 may generate integrated transmission signal TTS that swings between about 0V to about 6V based on the recognition signal RS. However, the embodiments of the inventive concept are not limited to the method of integrating the recognition signal RS and the first mode sensing signal MS1. For example, the method of integrating the recognition signal RS and the first mode sensing signal MS1 may be variously provided. Also, the embodiments of the inventive concept are not limited to the magnitude of the voltage of the integrated transmission signal TTS. For example, the magnitude of the voltage of the integrated transmission signal TTS may be variously set.

The integrated transmission signal TTS may be transmitted to the input device AP through the input sensor ISP. The input device AP may receive the integrated transmission signal TTS and transmit the integrated reception signal TRS in response thereto. The recognition part 111 may receive the integrated reception signal TRS from the input device AP through the input sensor ISP and determine whether the input device AP exists based on the received integrated reception signal TRS. When the input device does not exist based on a determination result of the recognition part 111, the control unit 110 senses the first input TC1 through the first input sensing part 112. However, when the input device AP exists based on the determination result of the recognition part 111, the control unit 110 may sense the second input TC2 through a second input sensing part 114 (refer to FIG. 9).

The first input sensing part 112 receives the integrated reception signal TRS through the input sensor ISP and senses the first input TC1 in the first mode based on the received integrated reception signal TRS. According to some example embodiments of the inventive concept, as illustrated in FIG. 7B, the first input sensing part 112 may sense the first input TC1 by accumulating the received integrated reception signals TRS1 to TRSr received during the preset number (e.g., r, where r is a natural number greater than 1) of the first input sensing frame IF1 and integrating the accumulated integrated reception signals TRS1 to TRSr. A magnitude of a voltage of a portion of the integrated reception signals TRS1 to TRSr may be varied by a capacitance provided by the first input TC1 at a time of sensing the first input TC1. The first input sensing part 112 may sense the first input TC1 by reflecting a magnitude variation ΔV of the integrated reception signals TRS1 to TRSr during several frames.

Figure 8:
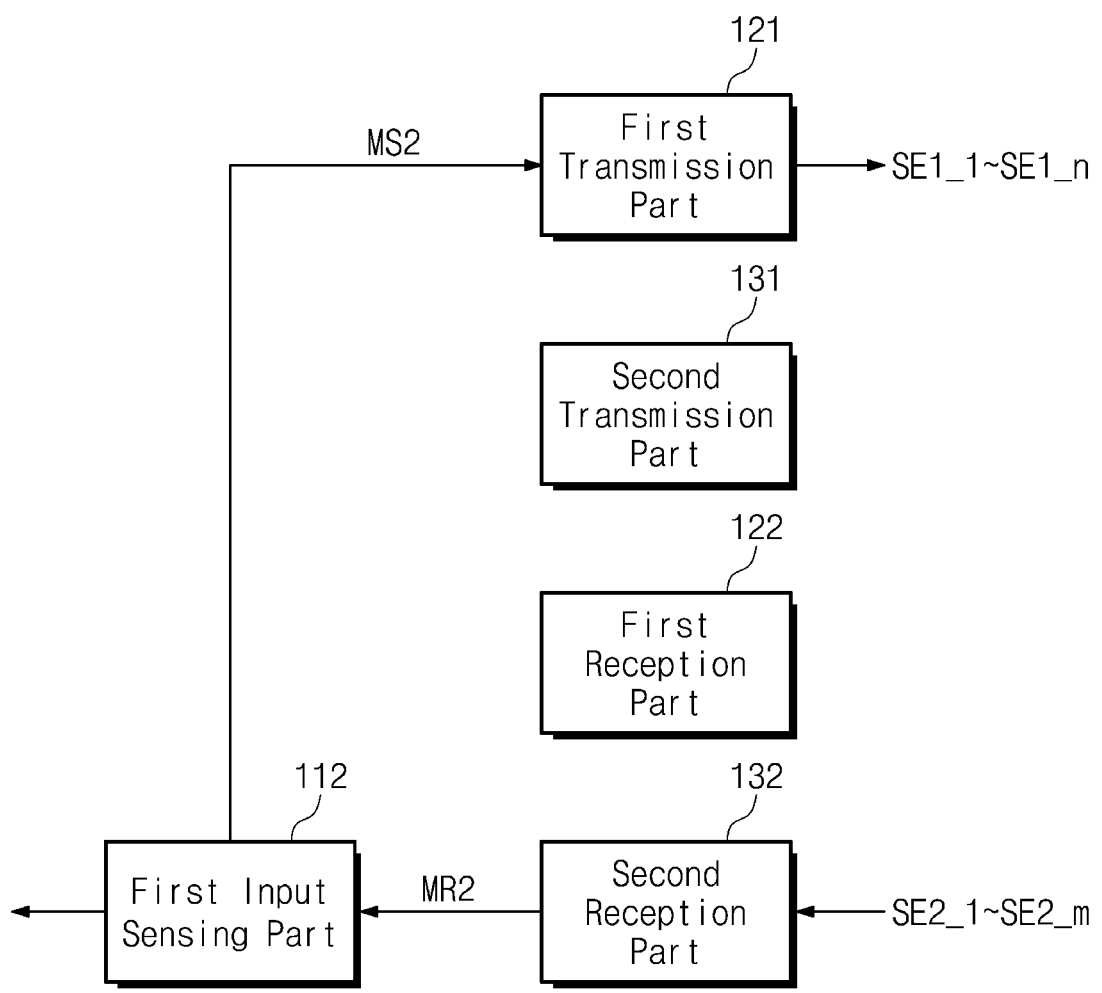
FIG. 8 is a block diagram representing a connection relationship between the first and second drivers and the control unit during a second operation period of the first input sensing frame according to some example embodiments of the inventive concept.

FIG. 8 is a block diagram representing a connection relationship between the first and second drivers and the control unit during the second operation period of the first input sensing frame according to some example embodiments of the inventive concept.

Referring to FIGS. 2A, 4A, 5, and 8, the first input sensing part 112 may output a second mode sensing signal MS2 for sensing the first input TC1 in the second mode during the second operation period OP2 of the first input sensing frame IF1. The second mode sensing signal MS2 outputted from the first input sensing part 112 during the first input sensing frame IF1 may be provided to the first transmission part 121 of the first driver 120. The first input sensing part 112 is not connected to the second transmission part 131 during the second operation period OP2. Thus, the second mode sensing signal MS2 may be provided to the first sensing electrodes SE1_1 to SE1_n of the input sensor ISP through the first transmission part 121 during the second operation period OP2.

Also, the first input sensing part 112 receives a sensing reception signal MR2 transmitted from the input sensor ISP during the second operation period OP2. The first input sensing part 112 receives the sensing reception signal MR2 through the second reception part 132 of the second driver 130. That is, the first input sensing part 112 may be connected to the second reception part 132 and receive the sensing reception signal MR2 from the second sensing electrodes SE2_1 to SE2_m of the input sensor ISP during the second operation period OP2. The first input sensing part 112 is not connected to the first transmission part 121 during the second operation period OP2.

The first input sensing part 112 may generate coordinate information on the first input TC1 based on the sensing reception signal MR2 and provide the generated coordinate information to the main controller 200.

Figure 9:
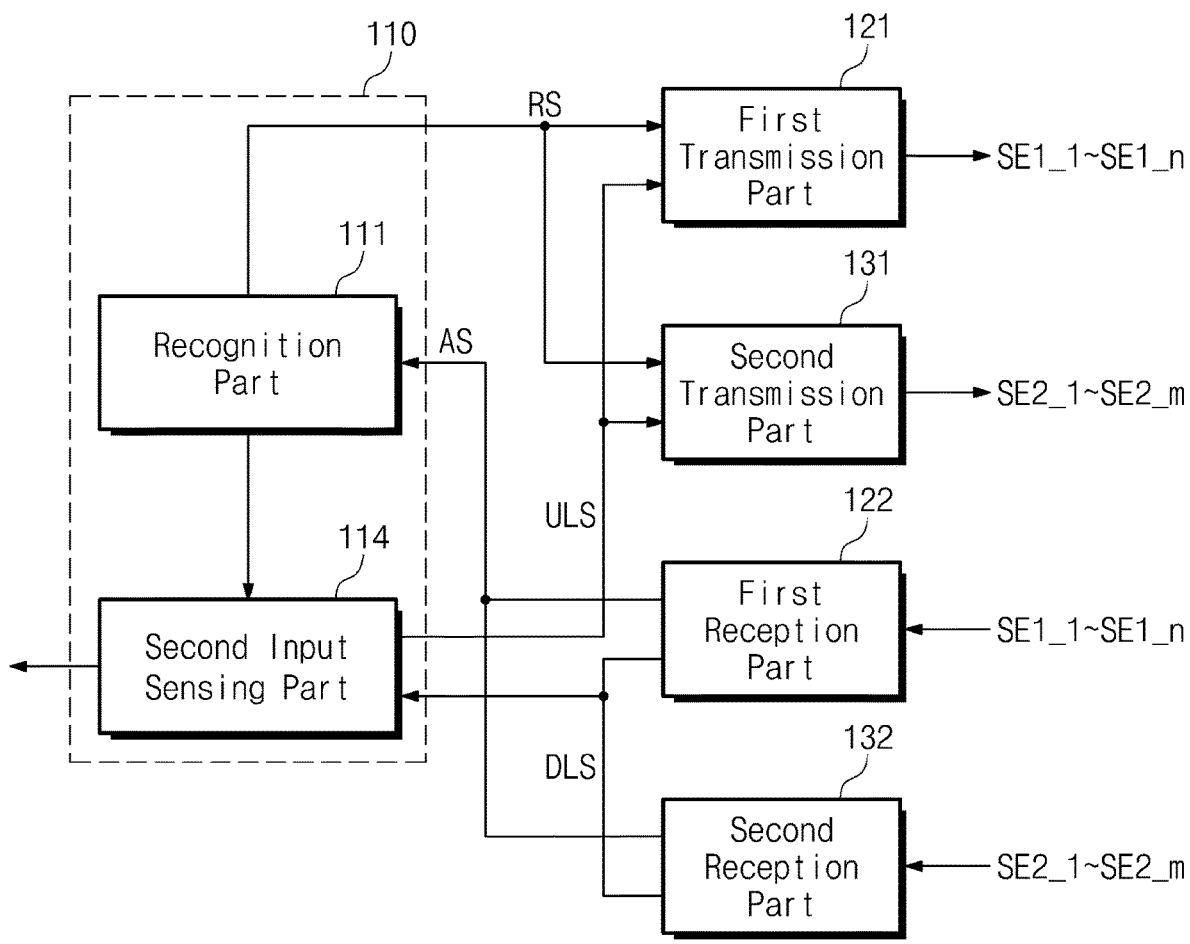
FIG. 9 is a block diagram representing a connection relationship between the first and second drivers and the control unit during a second input sensing frame according to some example embodiments of the inventive concept.

FIG. 9 is a block diagram representing a connection relationship between the first and second drivers and the control unit during the second input sensing frame according to some example embodiments of the inventive concept.

Referring to FIGS. 2A, 4B, 5, and 9, when the input device AP exists based on the determination result of the recognition part 111, the control unit 110 may sense the second input TC2 through a second input sensing part 114.

When the input sensor ISP is operated in the second input sensing mode, the recognition part 111 outputs the recognition signal RS for recognizing the input device AP. The recognition signal RS outputted from the recognition part 111 during the third operation period OP3 of the second input sensing frame IF2 may be transmitted to the first sensing electrodes SE1_1 to SE1_n of the input sensor ISP through the first transmission part 121 and the second sensing electrodes SE2_1 to SE2_m of the input sensor ISP through the second transmission part 131.

The recognition part 111 may receive the response signal AS from the input device AP through the input sensor ISP and determine whether the input device AP exists based on the received response signal AS. When the input device exists based on the determination result of the recognition part 111, the control unit 110 senses the second input TC2 through the second input sensing part 114. However, when the input device does not exist based on the determination result of the recognition part 111, the control unit 110 may sense the first input TC1 through the first input sensing part 112 (refer to FIG. 6).

The second input sensing part 114 performs a data communication for sensing the second input TC2 during the fourth operation period OP4 of the second input sensing frame IF2. The second input sensing part 114 outputs the uplink signal ULS during the fourth operation period OP4, and the outputted uplink signal ULS is transmitted to the input sensor ISP through the first and second transmission parts 121 and 131. When the input device AP is connected to the input sensor ISP, the uplink signal ULS is transmitted to the input device AP through the first and second sensing electrodes SE1_1 to SE1_n and SE2_1 to SE2_m of the input sensor ISP. When the input device AP contacts the input sensor ISP to output the downlink signal DLS, the outputted downlink signal DLS is provided to the first and second reception parts 122 and 132 through the first and second sensing electrodes SE1_1 to SE1_n and SE2_1 to SE2_m of the input sensor ISP. The second input sensing part 114 receives the downlink signal DLS from the first and second reception parts 122 and 132 and senses the second input TC2 based on the downlink signal DLS.

The second input sensing part 114 may generate coordinate information on the second input TC2 based on the downlink signal MS2 or all sorts of functional information and provide the generated information to the main controller 200.

Figure 10:
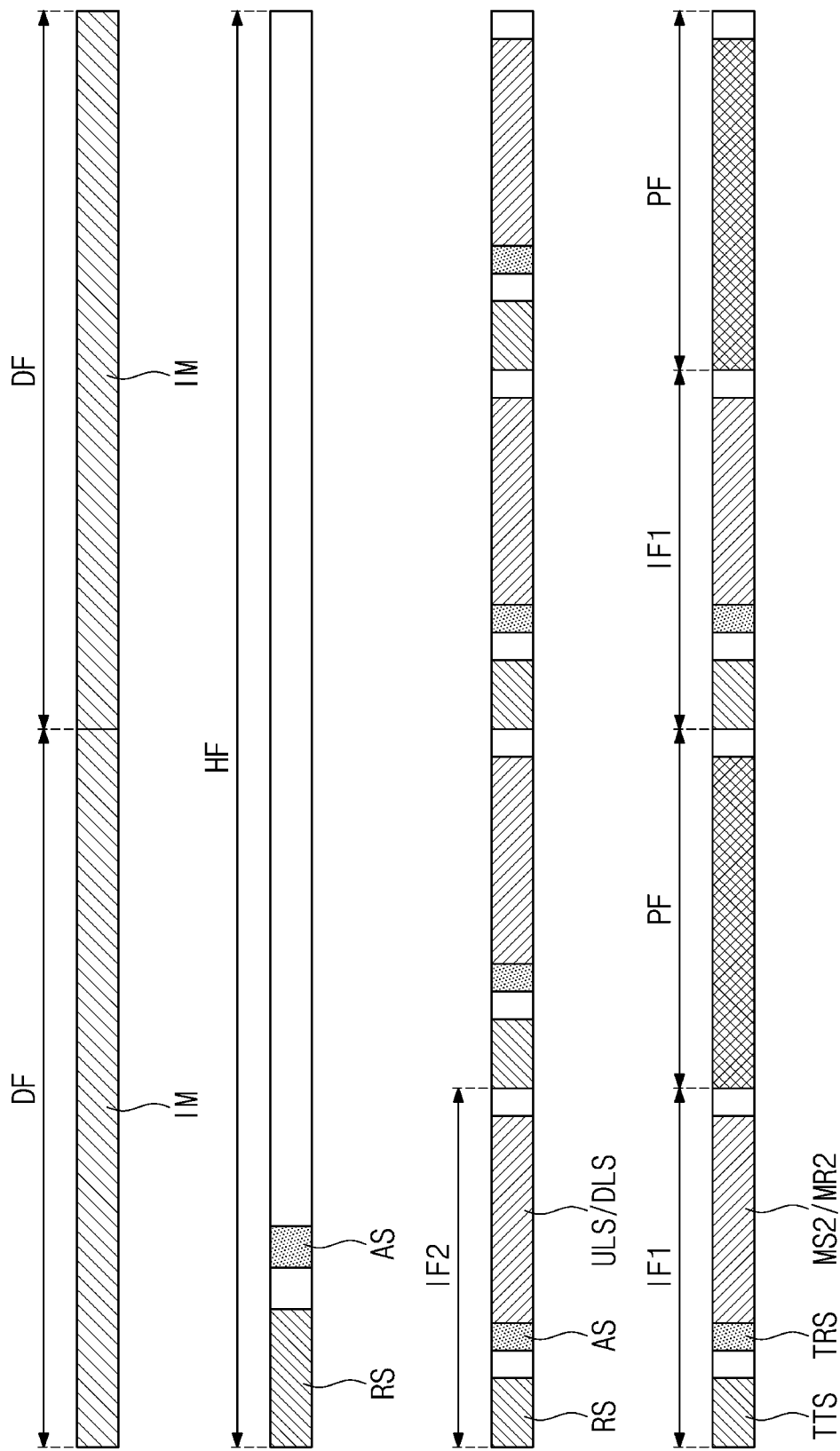
FIG. 10 is a conceptual view illustrating the first input sensing frame, the second input sensing frame and a holding frame according to some example embodiments of the inventive concept.
Figure 11:
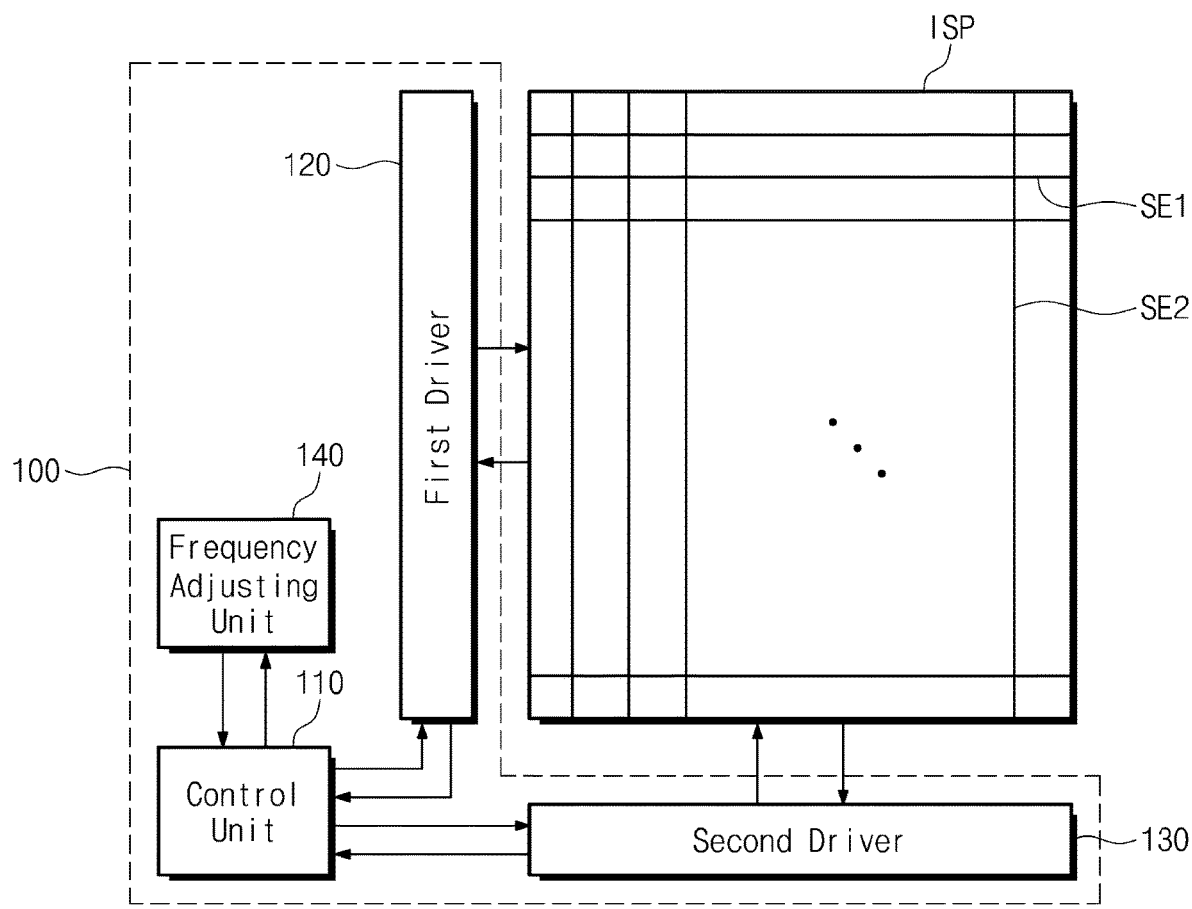
FIG. 11 is a block diagram representing a configuration of an input sensor and a sensor controller according to some example embodiments of the inventive concept.
Figure 12:
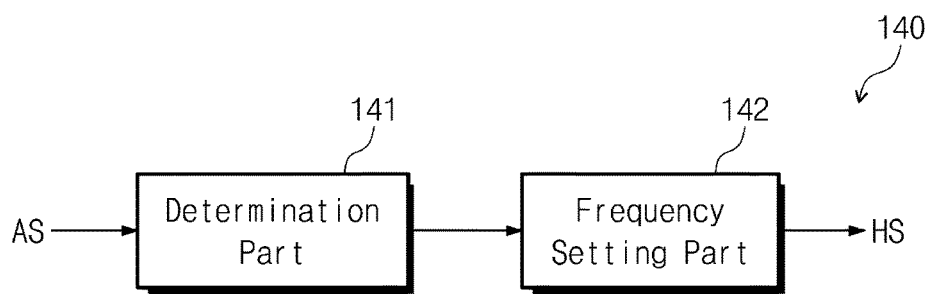
FIG. 12 is an internal block diagram of a frequency adjusting unit in FIG. 11.

FIG. 10 is a conceptual view illustrating the first input sensing frame, the second input sensing frame, and a holding frame according to some example embodiments of the inventive concept, and FIG. 11 is a block diagram representing a configuration of the input sensor and the sensor controller according to some example embodiments of the inventive concept. FIG. 12 is an internal block diagram illustrating a frequency adjusting unit in FIG. 11.

Referring to FIGS. 9 and 10, the electronic device ED (refer to FIG. 1B) displays an image IM through the display panel DP (refer to FIG. 1B). The display panel DP may display the image IM in the unit of one display frame DF.

While the electronic device ED displays the image through the display panel DP, the electronic device ED may sense the first input TC1 (refer to FIG. 2A) and the second input TC2 (refer to FIG. 2A). The electronic device ED may be operated in the first input sensing mode sensing the first input TC1 or in the second input sensing mode sensing the second input TC2 according to whether the input device AP (refer to FIG. 2A) exists. Here, a state in which the second input TC2 of the input device AP is not sensed although the input device AP exists may be referred to a standby state. According to some example embodiments of the inventive concept, the electronic device ED may be operated in a standby state in the above-described standby state.

According to some example embodiments of the inventive concept, an operation frequency of the input sensor ISP in the first and second input sensing modes may be equal to or greater than that of the display panel DP. For example, when the display panel DP has the operation frequency of about 120 Hz, the input sensor ISP may have the operation frequency of about 240 Hz. However, in the standby state, the input sensor ISP may have the operation frequency less than that of the display panel DP.

Here, detained description on a case when the input sensor ISP is operated in the first and second input sensing modes will be omitted to avoid overlap with that in FIGS. 4A and 4B.

When the input sensor ISP is operated in the standby state, the input sensor ISP may sense the first input IC1 or the second input TC2 in a unit of one holding frame HF. According to some example embodiments of the inventive concept, the input sensor ISP in the standby mode may be operated with the operation frequency of about 60 Hz, and in this case, a time corresponding to the holding frame HF may be about 16.7 ms.

The holding frame HF may include a fifth operation period OP5. During the fifth operation period OP5, the recognition part 111 outputs the recognition signal RS for recognizing the input device AP. During the fifth operation period OP5 of the holding frame HF, the recognition signal RS may be transmitted to the first sensing electrodes SE1_1 to SE1_n of the input sensor ISP through the first transmission part 121 and the second sensing electrodes SE2_1 to SE2_m of the input sensor ISP through the second transmission part 131. The recognition part 111 receives the response signal AS from the input device AP through the input sensor ISP and determines whether the input device AP exists based on the received response signal AS.

Here, although a feature of determining whether the input device AP exists by transmitting the recognition signal RS during the holding frame HF is illustrated as an example, the embodiments of the inventive concept are not limited thereto. For example, according to some example embodiments, whether the input device AP exists may be determined by transmitting the integrated transmission signal TTS during the holding frame HF.

Referring to FIGS. 11 and 12, the sensor controller 100 according to some example embodiments of the inventive concept may further include a frequency adjusting unit 140.

The operation frequency of the input sensor ISP for each operation mode may be adjusted by the frequency adjusting unit 140.

The frequency adjusting unit 140 includes a determination part 141 determining whether the input device AP is in the standby state and a frequency setting part 142 outputting an adjustment signal HS for adjusting the operation frequency of the input sensor ISP based on a determination result. Although the frequency adjusting unit 140 and the control unit 110 are illustrated as separated functional blocks in FIG. 11, the embodiments of the inventive concept are not limited thereto. For example, the frequency adjusting unit 140 may be contained in the control unit 110.

The frequency adjusting unit 140 may set the operation frequency of the input sensor ISP by a low frequency less than a reference frequency when the input device AP is in the standby state and by the reference frequency when the input device AP is not in the standby state. When the input device AP is not in the standby state, the input sensor ISP may have the operation frequency set by the reference frequency and be operated in the first and second input sensing modes.

Figure 13:
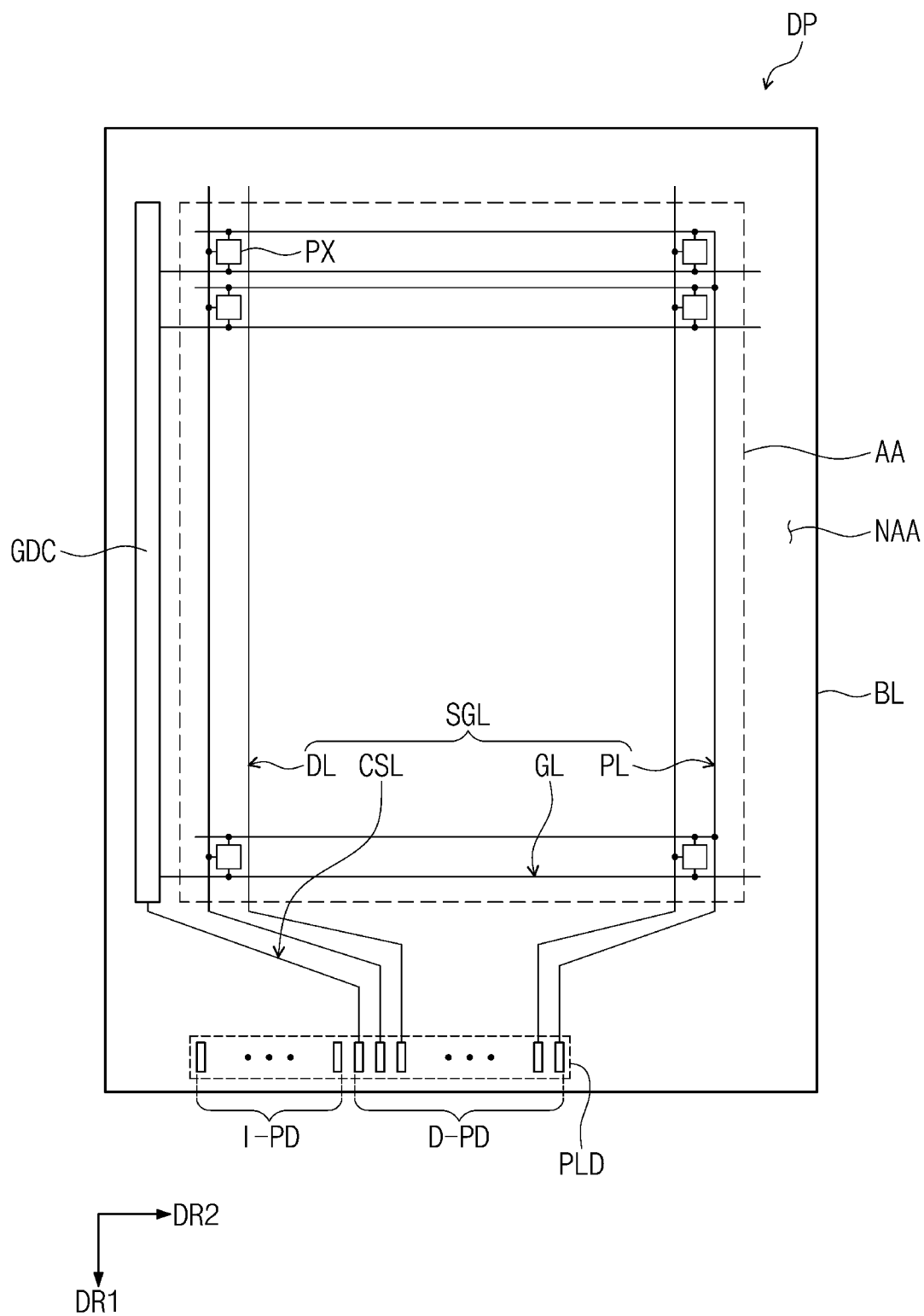
FIG. 13 is a plan view of a display panel according to some example embodiments of the inventive concept.
Figure 14:
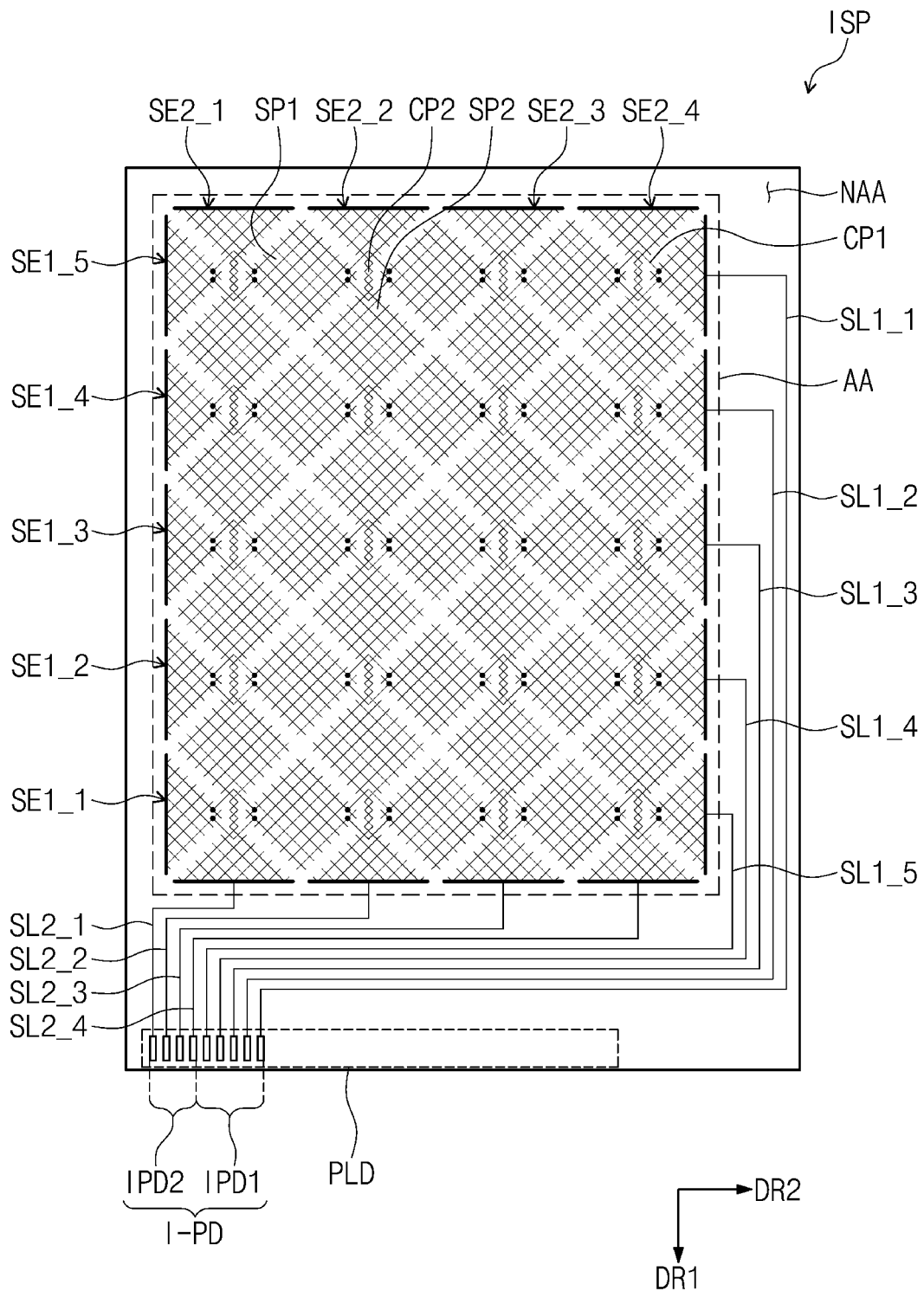
FIG. 14 is a plan view of the input sensor according to some example embodiments of the inventive concept.

FIG. 13 is a plan view illustrating the display panel according to some example embodiments of the inventive concept, and FIG. 14 is a plan view illustrating the input sensor according to some example embodiments of the inventive concept.

Referring to FIGS. 13 and 14, the display panel DP may include a driving circuit GDC, a plurality of signal lines SGL, and a plurality of pixels PX. The display panel DP may further include a pad part PLD located on the peripheral area NAA. The pad part PLD includes pixel pads D-PD each connected to a corresponding signal line of the plurality of signal lines SGL.

The pixels PX are located on the active area AA. Each of the pixels PX includes an organic light emitting diode and a pixel driving circuit connected thereto.

The driving circuit GDC may include a gate driving circuit. The gate driving circuit generates a plurality of gate signals and sequentially outputs the gate signals to a plurality of gate lines GL that will be described later. The gate driving circuit may further output another control signal to the pixel driving circuit.

The signal lines SGL includes gate lines GL, data lines DL, a power line PL, and a control signal line CSL. One gate line of the gate lines GL is connected to a corresponding pixel PX of the pixels PX, and one data line of the data lines DL is connected to a corresponding pixel PX of the pixels PX. The power line PL is connected to the pixels PX. The control signal line CSL may provide control signals to the driving circuit GDC. The signal lines SGL overlap the active area AA and the peripheral area NAA.

The pad part PLD, as a portion connected with the flexible circuit film FCB (refer to FIG. 1B), may include the pixel pads D-PD for connecting the flexible circuit film FCB to the display panel DP and input pads I-PD for connecting the flexible circuit film FCB to an input sensing unit ISP. The pixel pads D-PD are connected to the corresponding pixels PX through the signal lines SGL, respectively. Also, one pixel pad of the pixel pads D-PD may be connected to the driving circuit GDC.

Referring to FIG. 14, the input sensor ISP according to some example embodiments of the inventive concept includes the first sensing electrodes SE1_1 to SE1_5 and the second sensing electrodes DE2_1 to SE2_4. The input sensor ISP may further include first trace lines SL1_1 to SL1_5 connected to one side of the first sensing electrodes SE1_1 to SE1_5 and second trace lines SL2_1 to SL2_4 connected to one side of the second sensing electrodes SE2_1 to SE2_4.

The first sensing electrodes SE1_1 to SE1_5 and the second sensing electrodes SE2_1 to SE2_4 cross each other. A capacitance is provided between the first sensing electrodes SE1_1 to SE1_5 and the second sensing electrodes SE2_1 to SE2_4. The capacitance between the first sensing electrodes SE1_1 to SE1_5 and the second sensing electrodes SE2_1 to SE2_4 may be varied by an external input (i.e., the first input TC1).

Each of the first sensing electrodes SE1_1 to SE1_5 includes first sensor parts SP1 and first connection parts CP1, which are located on the active area AA. Each of the second sensing electrodes SE2_1 to SE2_4 includes second sensor parts SP2 and second connection parts CP2, which are located on the active area AA.

Although the first and second sensor parts SP1 and SP2 each having a rhombus shape are illustrated as an example in FIG. 14, the embodiments of the inventive concept are not limited thereto. For example, each of the first and second sensor parts SP1 and SP2 may have a different polygonal shape.

The first sensor parts SP1 are arranged in the second direction DR2 in one first sensing electrode, and the second sensor parts SP2 are arranged in the first direction DR1 in one second sensing electrode. Each of the first connecting parts CP1 connects the adjacent first sensor parts SP1 to each other, and each of the second connecting parts CP2 connects the adjacent second sensor parts SP2 to each other.

The first sensing electrodes SE1_1 to SE1_5 and the second sensing electrodes SE2_1 to SE2_4 may have a mesh shape. As the first sensing electrodes SE1_1 to SE1_5 and the second sensing electrodes SE2_1 to SE2_4 have the mesh shape, a parasitic capacitance with the electrodes of the display panel DP (refer to FIG. 13) may be reduced.

The first sensing electrodes SE1_1 to SE1_5 and the second sensing electrodes SE2_1 to SE2_4 having the mesh shape may include silver, aluminum, copper, chrome, nickel, titanium, etc., which are able to be processed in a low temperature process. However, the embodiments of the inventive concept are not limited thereto. Although the input sensor ISP is provided through a continuous process, the organic light emitting diodes may not be damaged.

The first trace lines SL1_1 to SL1_5 are connected to one ends of the first sensing electrodes SE1_1 to SE1_5, respectively. According to some example embodiments of the inventive concept, the input sensor ISP may further include trace lines connected to the other ends of the first sensing electrodes SE1_1 to SE1_5, respectively. The second trace lines SL2_1 to SL2_4 are connected to one ends of the second sensing electrodes SE2_1 to SE2_4, respectively. According to some example embodiments of the inventive concept, the input sensor ISP may further include trace lines connected to the other ends of the second sensing electrodes SE2_1 to SE2_4, respectively.

The first trace lines SL1_1 to SL1_5 and the second trace lines SL2_1 to SL2_4 may be located on the peripheral area NAA. The input sensor ISP may include the input pads I-PD extending from one ends of the first trace lines SL1_1 to SL1_5 and the second trace lines SL2_1 to SL2_4 and located on the peripheral area NAA. The input pads I-PD include first input pads IPD1 connected to the first trace lines SL1_1 to SL1_5 and second input pads IPD2 connected to the second trace lines SL2_1 to SL2_4.

When the input sensor senses the first input and the second input, the electronic device according to some example embodiments of the inventive concept may perform two operations at the same time by using the integrated signal obtained by integrating the recognition signal for recognizing the input device with the sensing signal for sensing the first input during a partial period of the first input sensing frame that senses the first input.

Thus, as the input sensor may use the period allocated for recognizing the input device to sense the first input in the high-speed driving electronic device, the degradation in input sensing performance of the input sensor during the high-speed driving may be prevented or reduced.

Although the example embodiments of the present invention have been described, it is understood that the present invention should not be limited to these example embodiments but various changes and modifications can be made by one ordinary skilled in the art within the spirit and scope of the present invention as hereinafter claimed. Hence, the real protective scope of the present invention shall be determined by the technical scope of the accompanying claims, and their equivalents.

What is claimed is:

1. An electronic device comprising:
a display panel configured to display an image;
an input sensor on the display panel and configured to sense a first input in first and second modes of a first input sensing mode;
a sensor controller connected to the input sensor; and
an input device configured to transceive two or more signals with the sensor controller through the input sensor and to provide a second input to the input sensor in a second input sensing mode,
wherein the sensor controller is configured to sense the first input through the input sensor during a first input sensing frame of the first input sensing mode and the second input generated by the input device during a second input sensing frame of the second input sensing mode, and
wherein the sensor controller is configured to transmit, to the input sensor, an integrated transmission signal during a first operation period of the first input sensing frame to simultaneously perform recognition of the input device and sensing of the first input in the first mode,
wherein the integrated transmission signal is a signal that integrates a recognition signal for recognizing the input device and a first mode sensing signal for sensing the first input in the first mode.

2. The electronic device of claim 1, wherein the input sensor comprises:
a plurality of first sensing electrodes; and
a plurality of second sensing electrodes that are electrically insulated from the first sensing electrodes.

3. The electronic device of claim 2, wherein the sensor controller comprises:
a first driver connected to the first sensing electrodes;
a second driver connected to the second sensing electrodes; and
a control unit configured to control driving of each of the first and second drivers.

4. The electronic device of claim 3, wherein the first driver comprises:
a first transmission part connected to the control unit and configured to transmit a signal received from the control unit to the first sensing electrodes;
a first reception part configured to receive a signal from the first sensing electrodes and to transmit the received signal to the control unit; and a first switching part configured to selectively connect the first sensing electrodes to the first transmission part or the first reception part in response to a first selection signal, and the second driver comprises:
a second transmission part connected to the control unit and configured to transmit a signal received from the control unit to the second sensing electrodes;
a second reception part configured to receive a signal from the second sensing electrodes and to transmit the received signal to the control unit; and
a second switching part configured to selectively connect the second sensing electrodes to the second transmission part or the second reception part in response to a second selection signal.

5. The electronic device of claim 2, wherein the first input sensing frame further comprises a second operation period after the first operation period, and
the sensor controller is configured to transmit a second mode sensing signal for sensing the first input in the second mode to the input sensor during the second operation period.

6. The electronic device of claim 5, wherein in the first mode, the first and second sensing electrodes are configured to receive the integrated transmission signal during the first operation period, and
in the second mode, the first sensing electrodes are configured to receive the second mode sensing signal during the second operation period, and the second sensing electrodes are configured to transmit sensing reception signal sensed during the second operation period to the sensor controller.

7. The electronic device of claim 5, wherein the first input sensing frame further comprises a first response period between the first operation period and the second operation period to receive an integrated reception signal from the input sensor.

8. The electronic device of claim 7, wherein the integrated reception signal comprises recognition information on whether or not the input device exists and sensing information sensed in the first mode.

9. The electronic device of claim 7, wherein the sensor controller comprises:
a recognition part configured to receive the integrated reception signal from the input sensor and to sense whether or not the input device exists based on the integrated reception signal during the first input sensing frame; and
a first input sensing part configured to sense the first input in the first mode based on the integrated reception signal.

10. The electronic device of claim 9, wherein the sensor controller further comprises an integrated signal generation part configured to generate the integrated transmission signal by integrating the recognition signal and the first mode sensing signal and to output the generated integrated transmission signal.

11. The electronic device of claim 9, wherein the first input sensing part is configured to transmit the second mode sensing signal to the input sensor, to receive a sensing reception signal from the input sensor, and to sense the first input in the second mode based on the sensing reception signal during the second operation period.

12. The electronic device of claim 9, wherein the second input sensing frame comprises a third operation period and a fourth operation period, and the sensor controller further comprises a second input sensing part configured to sense the second input by providing an uplink signal to the input sensor and receiving a downlink signal from the input sensor during the second input sensing frame.

13. The electronic device of claim 12, wherein the recognition part is configured to output a recognition signal for recognizing the input device to the input sensor during the third operation period.

14. The electronic device of claim 13, wherein the second input sensing frame further comprises a second response period between the third operation period and the fourth operation period to receive a response signal from the input device.

15. The electronic device of claim 14, wherein the response signal comprises recognition information indicating whether or not the input device exists, and
the recognition part is configured to sense whether or not the input device exists based on the response signal during the second input sensing frame.

16. The electronic device of claim 1, wherein the sensor controller further comprises a frequency adjusting unit configured to adjust an operation frequency of the input sensor.

17. The electronic device of claim 16, wherein the frequency adjusting unit comprises:
a determination part configured to determine whether or not the input device is in a standby state; and
a frequency setting part configured to set an operation frequency of the input sensor to be less than a reference frequency in response to the input device being in the standby state and to set the operation frequency to be equal to the reference frequency in response to the input device not being in the standby state.

18. The electronic device of claim 1, wherein the first input is an input generated by contact of a finger of a user, and
the second input is an input generated by contact of the input device.

19. The electronic device of claim 18, wherein the input device is an active pen.

20. An electronic device comprising:
a display panel configured to display an image;
an input sensor on the display panel to sense a first input in a first input sensing mode;
a sensor controller connected to the input sensor; and
an input device configured to transceive two or more signals with the sensor controller through the input sensor and to provide a second input to the input sensor in a second input sensing mode,
wherein the sensor controller is configured to sense the first input through the input sensor during a first input sensing frame of the first input sensing mode and the second input generated by the input device during a second input sensing frame of the second input sensing mode,
wherein the first input sensing frame comprises a first recognition period for recognizing the input device, and the second input sensing frame comprises a second recognition period for recognizing the input device, and
wherein an integrated transmission signal is transmitted to the input sensor during the first recognition period to simultaneously perform recognition of the input device and sensing of the first input, the integrated transmission signal is a signal that integrates a recognition signal for recognizing the input device and a sensing signal for sensing the first input, wherein the recognition signal is transmitted to the input sensor during the second recognition period.

21. The electronic device of claim 20, wherein the input sensor is configured to sense the first input in first and second modes, and the sensor controller is configured to transmit, to the input sensor, an integrated transmission signal comprising a recognition signal for recognizing the input device during the first recognition period of the first input sensing frame and a first mode sensing signal for sensing the first input in the first mode.

22. The electronic device of claim 21, wherein the sensor controller is configured to transmit, to the input sensor, the recognition signal for recognizing the input device during the second recognition period of the second input sensing frame.

23. The electronic device of claim 21, wherein the input sensor comprises:

a plurality of first sensing electrodes; and a plurality of second sensing electrodes that are electrically insulated from the first sensing electrodes.

24. The electronic device of claim 23, wherein in the first mode, the first and second sensing electrodes are configured to receive the integrated transmission signal during the first recognition period, and in the second mode, the first sensing electrodes are configured to receive a second mode sensing signal, and the second sensing electrodes are configured to provide a sensed sensing reception signal to the sensor controller.

25. The electronic device of claim 20, wherein the first input is an input generated by contact of a finger of a user, and the second input is an input generated by contact of the input device.

26. The electronic device of claim 25, wherein the input device is an active pen.

* * * * *